(12) United States Patent
Claussen et al.

(10) Patent No.: US 8,462,969 B2
(45) Date of Patent: Jun. 11, 2013

(54) SYSTEMS AND METHODS FOR OWN VOICE RECOGNITION WITH ADAPTATIONS FOR NOISE ROBUSTNESS

(75) Inventors: Heiko Claussen, Plainsboro, NJ (US); Michael T. Loiacono, Hillsborough, NJ (US); Henning Puder, Erlangen (DE); Justinian Rosca, West Windsor, NJ (US)

(73) Assignee: Siemens Audiologische Technik GmbH, Erlangen (DE)

( * ) Notice: Subject to any disclaimer, the term of this patent is extended or adjusted under 35 U.S.C. 154(b) by 139 days.

(21) Appl. No.: 13/089,738

(22) Filed: Apr. 19, 2011

(65) Prior Publication Data

US 2011/0261983 A1 Oct. 27, 2011

Related U.S. Application Data

(60) Provisional application No. 61/326,761, filed on Apr. 22, 2010.

(51) Int. Cl.
*H04R 25/00* (2006.01)
*G10L 17/00* (2006.01)
*G10L 21/02* (2006.01)

(52) U.S. Cl.
USPC .......................... 381/317; 704/226; 704/246

(58) Field of Classification Search
USPC .................................. 704/226, 246; 381/317
See application file for complete search history.

(56) References Cited

U.S. PATENT DOCUMENTS

| 5,412,735 | A * | 5/1995 | Engebretson et al. | 381/317 |
| 7,343,023 | B2 * | 3/2008 | Nordqvist et al. | 381/321 |
| 7,738,665 | B2 * | 6/2010 | Dijkstra et al. | 381/315 |
| 7,853,031 | B2 * | 12/2010 | Hamacher | 381/317 |
| 2008/0175423 | A1 * | 7/2008 | Hamacher | 381/317 |
| 2009/0216693 | A1 * | 8/2009 | Rujan et al. | 706/12 |

OTHER PUBLICATIONS

Renevey, P. and Drygajlo, A. "Entropy Based Voice Activity Detection in Very Noisy Conditions" Proceedings of 7th European Conference on Speech Communication and Technology, EUROSPEECH'2001, pp. 1887-1890.*
Claussen, Heiko "Mutual Features for Robust Identification and Verification", *Siemens Corporate Research Inc., School of Electronics and Computer Science, University of Southampton*, 4 pgs.
Fan, Ningping "Enhanced VQ-based Algorithms for Speech Independent Speaker Identification", *Siemens Corporate Research Inc.*, 8 pgs.
Fan, Ningping "Low Distortion Speech Denoising Using an Adaptive Parametric Wiener Filter", *Siemens Corporate Research Inc., IEEE* 2004, 309-312.

(Continued)

*Primary Examiner* — Brian Ensey
*Assistant Examiner* — Katherine Faley
(74) *Attorney, Agent, or Firm* — Donald B. Paschburg

(57) ABSTRACT

Own voice recognition (OVR) for hearing aids, detects time instances where the person wearing the device is speaking. Classification of the own voice is performed dependent on a fixed or adaptive detection threshold. Automatic tuning in a real-time system depends on general noise statistics in the input signals. The noise is removed from the received signal and is characterized by signal-to-noise ratio and noise color. An optimal detection threshold for own voice recognition is determined based on the noise characteristics. A noise detection model is created by smoothed Voronoi tessellation. Own voice detection is performed by a processor.

16 Claims, 24 Drawing Sheets

OTHER PUBLICATIONS

Fan, Ningping "Speaker Verification with Combined Threshold, Identification Front-end, and UBM", *Siemens Corporate Research Inc.*, 6 pgs.

Fan, Ningping "Speech Noise Estimation Using Enhanced Minima Controlled Recursive Averaging", *Siemens Corporate Research Inc., IEEE* 2007, 581-584.

Reynolds, Douglas a. "Speaker identification and verification using Gaussian mixture speaker models", *Speech Communication 17* 1995, 91-108.

Wan, Vincent "Evaluation of Kernel Methods for Speaker Verification and Identification". *Dept. of Computer Science, University of Sheffield. IEEE* 2002, 669-672.

Zheng, Yanli "Air-And Bone-Conductive Integrated Microphones for Robust Speech Detection and Enhancement", *Microsoft Research*, Redmond, WA, 6 pgs.

* cited by examiner

SYSTEMS AND METHODS FOR OWN VOICE RECOGNITION WITH ADAPTATIONS FOR NOISE ROBUSTNESS

CROSS REFERENCE TO RELATED APPLICATIONS

The present application claims the benefit of U.S. Provisional Patent Application Ser. No. 61/326,761 filed on Apr. 22, 2010, which is incorporated by reference herein in its entirety.

BACKGROUND

The present invention relates to a hearing aid device. More specifically, this invention relates to a hearing aid device that is trained to recognize speech of a hearing aid user adaptive to noise conditions.

Own speaker recognition for hearing aids identifies the voice of the person that is wearing the device at each time instance, say per second. This information can be used to control the speech enhancement function of the hearing aid. However, classification of a speaker by the hearing aid is sensitive to environmental noise conditions, which can negatively influence the correct recognition of the speech of the hearing aid user. A hearing aid can be used in different noise conditions, which can influence the own voice recognition negatively in different ways and for which different detection criteria may be required.

Accordingly, improved and novel methods and devices to detect a hearing aid device user's own voice adaptive to different noise conditions are required.

SUMMARY

Own voice recognition (OVR) for hearing aids aims to detect time instances where the person wearing the device is speaking. The result of this detection can be used to optimize the internal signal processing in the hearing aid. For example, adaptation in signal processing could be turned off when the person wearing the device is speaking therefore minimizing distortions of the own speech. Similarly, spectral content and sounds could be shaped in a desirable way when the owner is speaking, etc.

An initial static own voice recognition system is provided. Classification herein is performed dependent on a fixed threshold theta. The tests on noise cases, such as music and street noise, shows that this approach can result in high miss rates.

Aspects of the present invention enable automatic tuning in a real-time system dependent on the noise statistics in the input signals. In accordance with one aspect of the present invention, the system is tuned dependent on general noise statistics rather than particular noise cases. The intuition is that not all possible noise cases may be modeled but all noise cases can be described by their noise statistics. Thus such a system can address unseen noise conditions. In accordance with an aspect of the present invention a method is provided for using a hearing aid device by a hearing aid user, comprising a processor in the hearing aid generating a first signal representing sound received by the hearing aid device, the processor processing the first signal to provide a noise reduced signal representative of speech and a noise signal, the processor processing the noise signal to determine at least a first and a second noise feature, the processor processing the noise reduced signal to determine a speech feature, the processor estimating a classification threshold based on the at least first and second noise feature, and the processor processing information from a database about the speech, the speech feature and the classification threshold to determine whether the noise reduced signal represents the hearing aid user's own voice.

In accordance with a further aspect of the present invention a method is provided, further comprising, the processor adjusting control of electronics in the hearing aid depending on the results of determining whether the noise reduced signal represents the hearing aid user's own voice.

In accordance with yet a further aspect of the present invention a method is provided, further comprising the processor changing beamforming settings of the hearing aid device based on the step of determining that the noise reduced signal represents the own voice of the hearing aid user.

In accordance with yet a further aspect of the present invention a method is provided, wherein a noise feature is determined from a noise signal that is derived from a difference between a delayed first signal and the noise reduced signal.

In accordance with yet a further aspect of the present invention a method is provided, wherein the at least first noise feature is a signal-to-noise ratio.

In accordance with yet a further aspect of the present invention a method is provided, wherein the at least second noise feature is a noise color.

In accordance with yet a further aspect of the present invention a method is provided, wherein the noise color is estimated from an entropy measure of normalized spectral noise power evaluated from the noise signal, the normalized spectral noise power being segmented over a plurality of windows.

In accordance with yet a further aspect of the present invention a method is provided, wherein the classification threshold is determined from a predictive threshold space that was learned from a plurality of noise signals and a plurality of speech signals from a plurality of speakers.

In accordance with yet a further aspect of the present invention a method is provided, wherein the predictive threshold space was learned off-line.

In accordance with yet a further aspect of the present invention a method is provided, wherein the predictive threshold space is created from tessellation using discrete training points.

In accordance with another aspect of the present invention a device is provided, comprising a hearing aid, including a memory enabled to store data including instructions to be performed by a processor, the processor enabled to execute instructions retrieved from the memory on data retrieved from the memory to perform the steps: receiving a first signal that is a signal representing speech of the hearing aid user with an added noise signal, processing the first signal to provide a noise reduced signal, determining at least a first and a second noise feature, determining a speech feature, estimating a classification threshold based on the at least first and second noise feature, and classifying the speech feature based on the classification threshold.

In accordance with yet another aspect of the present invention a device is provided, further comprising the processor determining whether the first signal represents speech of the hearing aid user.

In accordance with yet another aspect of the present invention a device is provided, further comprising the processor changing beamforming settings of the hearing aid device based on the determining that the first signal represents speech of the hearing aid user.

In accordance with yet another aspect of the present invention a device is provided, wherein a noise feature is determined by the processor from a noise signal that is a difference between a delayed first signal and the noise reduced signal.

In accordance with yet another aspect of the present invention a device is provided, wherein the at least first noise feature is a signal-to-noise ratio.

In accordance with yet another aspect of the present invention a device is provided, wherein the at least second noise feature is a noise color.

In accordance with yet another aspect of the present invention a device is provided, wherein the noise color is estimated by the processor from an entropy measure of a normalized spectral noise power evaluated from the noise signal, the normalized spectral noise power being segmented over a plurality of windows.

In accordance with yet another aspect of the present invention a device is provided, wherein the classification threshold is determined by the processor from a predictive threshold space that was learned from a plurality of noise signals and a plurality of speech signals from a plurality of speakers.

In accordance with yet another aspect of the present invention a device is provided, wherein the predictive threshold space is created by tessellation using discrete training points.

In accordance with a further aspect of the present invention a method is provided for voice recognition of a device user, comprising a processor in the device generating a first signal representing sound received by the device, the processor processing the first signal to provide a noise reduced signal representative of speech and a noise signal, the processor processing the noise signal to determine at least a first noise feature, the processor processing the noise reduced signal to determine a speech feature, the processor estimating a classification criterion based on the at least first noise feature, and the processor processing the speech feature and the classification criterion to determine whether the speech feature represents the device user's own voice.

DESCRIPTION OF A PREFERRED EMBODIMENT

Figure 1:
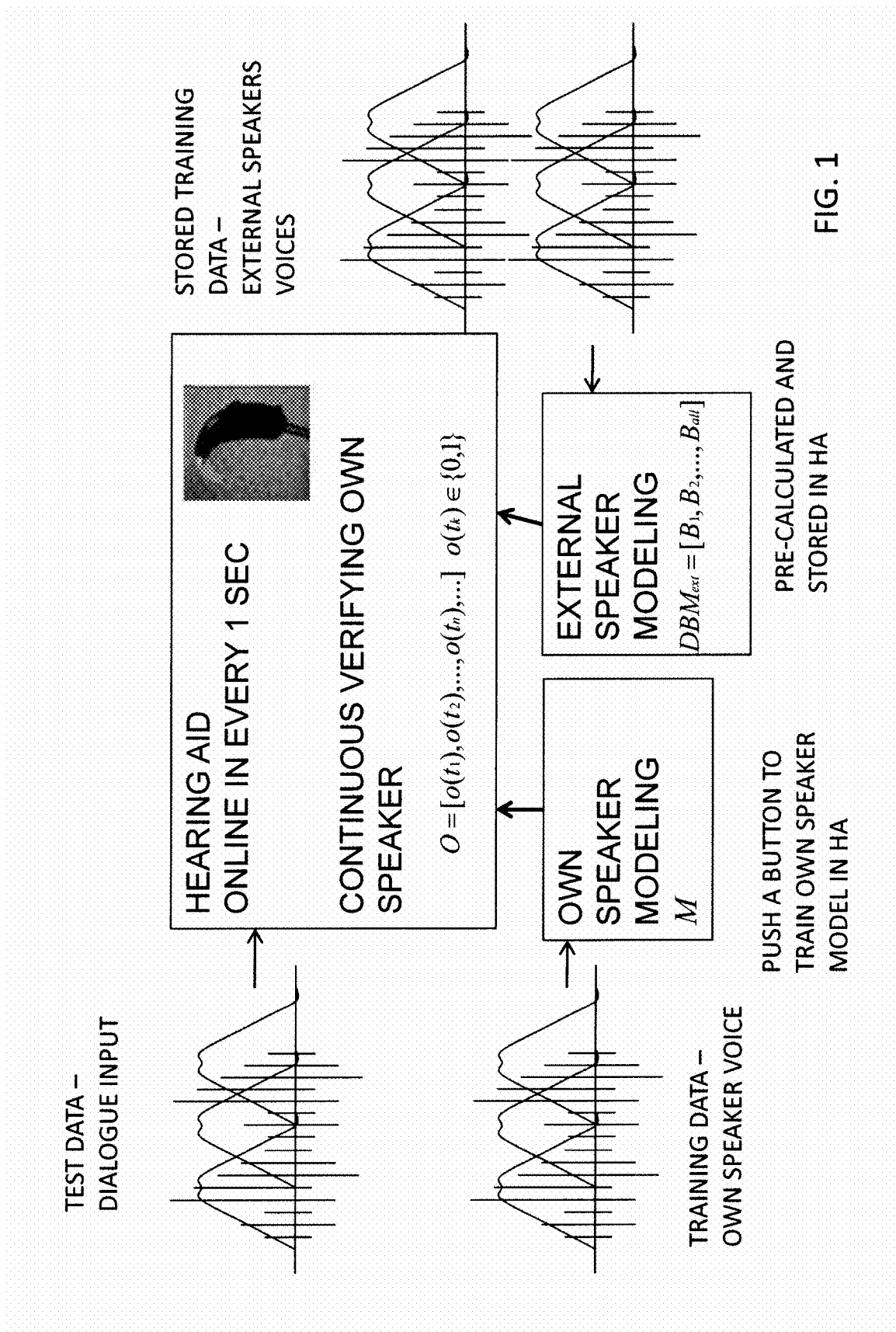
FIG. 1 illustrates a functional block diagram of a system for own voice recognition.

Own speaker recognition for hearing aids identifies the voice of the person that is wearing the device at each time instance, say per second. This information can be used to control the speech enhancement function of the hearing aid. To achieve this functionality, one could use a specialized sensor, such as the bone conductive sensor as described in "Y. Zheng, et al., *"Air- and bone-conductive integrated microphones for robust speech detection and enhancement"*, ASRU 2003." and develop a voice activity detector for this signal. However, such an approach has not been used because of hearing aid constraints in power usage and size. Herein, we utilize speaker verification techniques to solve this problem.

One application of own voice recognition in a hearing aid is in the control of a beamforming application in a multimicrophone hearing aid. The use of signal processing can "focus" the signals received by a multimicrophone sensor on a dedicated speaker. This beamforming property may become undesirable when the user of the hearing aid is speaking, as the hearing aid will focus on the speaker's voice which may provide an undesirable experience for the user when a focus is on his/her own voice. In accordance with an aspect of the present invention an electronic control in the hearing aid that controls the beamforming property is adapted to own voice recognition or lessened or even cancelled when own voice recognition occurs. This may improve the user's experience.

There are several challenges to be addressed to achieve and improve own voice recognition:

1) Adaptation to the hearing aid use scenarios and the audio perception environment. The own speaker's voice is transmitted both though air and body vibrations to the hearing aid microphones. This differs to external speaker voices or noises that are transmitted only through the air to the hearing aid microphones. The own speaker's voice is affected by a roughly fixed mouth to ear transfer function, while external voices are not.

2) Improvement of the recognition accuracy. As the accuracy is proportional to the length of the test data from one speaker, it is challenging to use short data intervals. However, frequent speaker switching in the dialog conversation confines the data length used for recognition.

3) Coping with noise. It is necessary that hearing aids can be used in noisy cafeterias, fast moving automobiles etc.

The own voice recognition was developed in several stages. In a first stage, speaker verification techniques were improved using the NTIMIT corpus. It was shown that a new method achieved comparable or better results than published work on MFCC-SVM described in "Vincent Wan, Steve Renals, *"Evaluation of kernel methods for speaker verification and identification"*, ICASSP-02, 2002" and MFCC-GMM-UBM described in "Douglas A. Reynolds, *"Speaker identification and verification using Gaussian mixture speaker models"*, Speech Communication archive. Volume 17, Issue 1-2, 1995." In a second stage, a Support Vector solution was adapted to the hearing aid scenarios and run tests on an available dataset. This work included noise handling and testing.

A first version of a solution, provided in accordance with an aspect of the present invention, achieves an equal error rate of about 5% for clean signal, and below 20% for heavy noise filtered signals. Another version, based on the first version, but with recognition capabilities adaptive to noise conditions will be provided herein later.

An outline of a first designed own voice recognition system is shown in FIG. 1. The sound signal of one time instance (sec), captured by the hearing aid microphone, is checked against the own speaker and background models resulting in a binary decision.

Speaker Verification Technology Development with NTIMIT

Several different speaker verification technologies have been developed and evaluated, including an initial Mutual Independence Analysis speaker identification demo (MIA) described in "Heiko Claussen, Justinian Rosca, and R. Damper. "*Mutual features for robust identification and verification*", Proc. International Conference on Acoustics, Speech and Signal Processing (ICASSP-08), pp. 1849-1852, Las Vegas, Nev., 2008.," the mel-frequency cepstral coefficients and vector quantization (MFCC-VQ) described in "Ningping Fan and Justinian Rosca; "*Enhanced VQ-based algorithms for speech independent speaker identification*", Proc. International Conference on Audio, Video, and Biometric based Person Authentication (AVBPA-03), pp. 470-477, Guildford, UK, June 2003" and an improved version of MIA.

The speaker verification was enhanced with a dynamic background model (DBM), where the best matched model among all available speakers is selected as the background. A normalized distance from the background model is compared to a threshold θ to determine the acceptance or rejection of the current input instance:

$$\frac{D_M(S) - D_{DBG}(S)}{D_M(S) + D_{DBG}(S)} < \theta \text{ where } D_{DBG}(S) = \min_{\forall I}\{D_I(S)\} \quad (1)$$

Here, S is submitted speech, $D_M(.)$ is the distance from the claimant model, $D_{DBG}(.)$ is the distance from the DBM, and 1 is any model in the speaker database respectively. The threshold 0<θ<1 is used to trade-off the false acceptance and false rejection rates. Experiments showed that the DBM outperforms the standard universal background model (UBM) as described in "Ningping Fan, Justinian Rosca, and Radu Balan; "*Speaker verification with combined threshold, identification front-end, and UBM*", AutoID 2005, Fourth IEEE Workshop on Automatic Identification Advanced Technologies, Buffalo, N.Y., USA, 17-18 Oct. 2005." Thus, the Dynamic background model dynamically selects the model from the speaker database (which contains a large number of speaker models) that has the minimum distance with the current speech input. That is, each input speech can be compared to a different model from the database. Other possible approaches such as the UBM generate a single universal background model from the speaker database to which all input speech is compared to.

Figure 2:
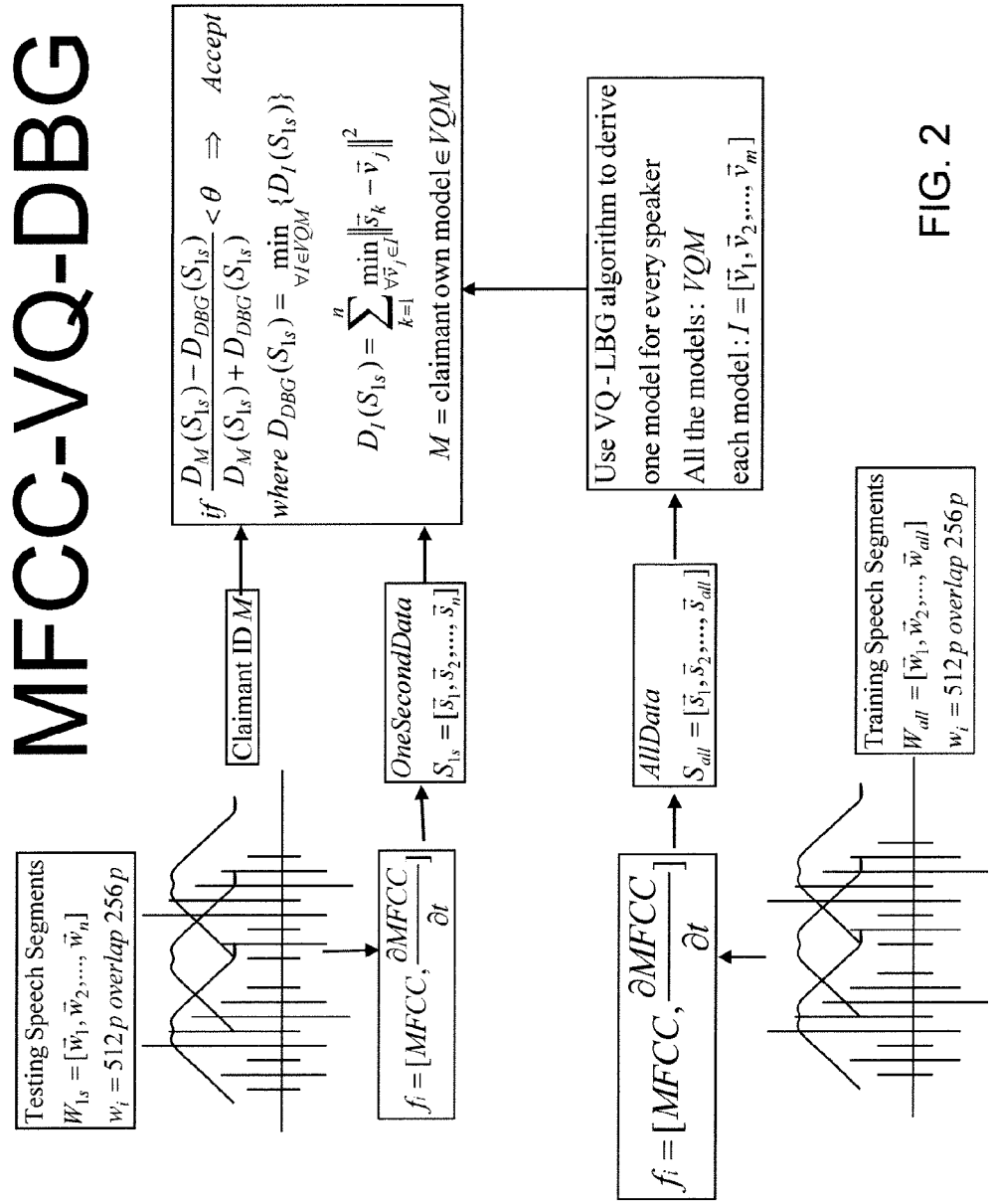
FIG. 2 illustrates steps in a system for own voice recognition in accordance with an aspect of the present invention.

A preferred solution is a MFCC-VQ-NoCMS-DBM algorithm, which achieves the best results. The abbreviation of the method stands for the mel-frequency cepstral coefficient feature, vector quantization classifier, no cepstral mean subtraction and the dynamic background model. The cepstral mean subtraction is a technique to normalize different types of microphones used in training and testing respectively. This has some disadvantages if the same type microphone is used for both training and testing. The cepstral mean subtraction is less advantageous in the own speech recognition application because training and testing is be performed using the owners hearing aid microphone. An outline of the method in accordance with an aspect of the present invention is shown in FIG. 2.

The implementation of a MFCC-UBM method achieves equivalent results to "Douglas A. Reynolds, "*Speaker identification and verification using Gaussian mixture speaker models*", Speech Communication archive. Volume 17, Issue 1-2, 1995" on NTIMIT. However, this EER can be improved to 3.40% by using a DBM without cepstral mean subtraction. This improvement is higher than between the MFCC-GMM-llr-UBM and the MFCC-Polynomial in "Vincent Wan, Steve Renals, "*Evaluation of kernel methods for speaker verification and identification*", ICASSP-02, 2002." Therefore, it is hypothesized that the approach provided in accordance with an aspect of the present invention can outperform all compared methods.

The experimentally found 'optimal' solution has been chosen as the speaker verification method for own voice recognition. However, the intuition is that further accuracy improvement may be possible via fusion of the MFCC based method and MIA.

Own Speaker Recognition for Hearing Aids

Figure 3:
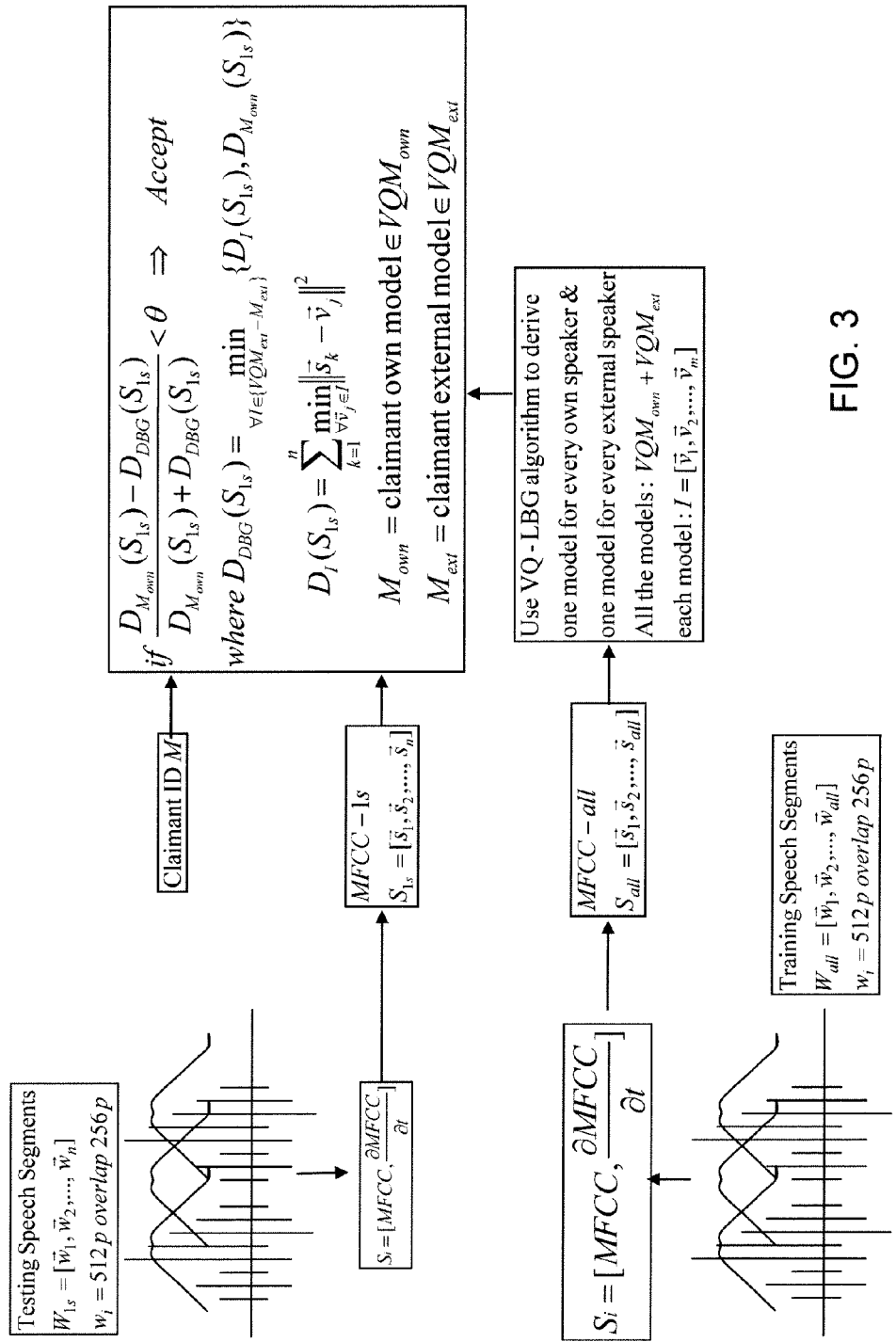
FIG. 3 illustrates aspects of a system in accordance with an aspect of the present invention.

A design of the own voice speaker verification method is given in FIG. 3 that shows in diagram the own voice speaker verification method OV-MFCC-VQ-NoCMS-DBM.

Improving Recognition Under Noisy Conditions

Figure 4:
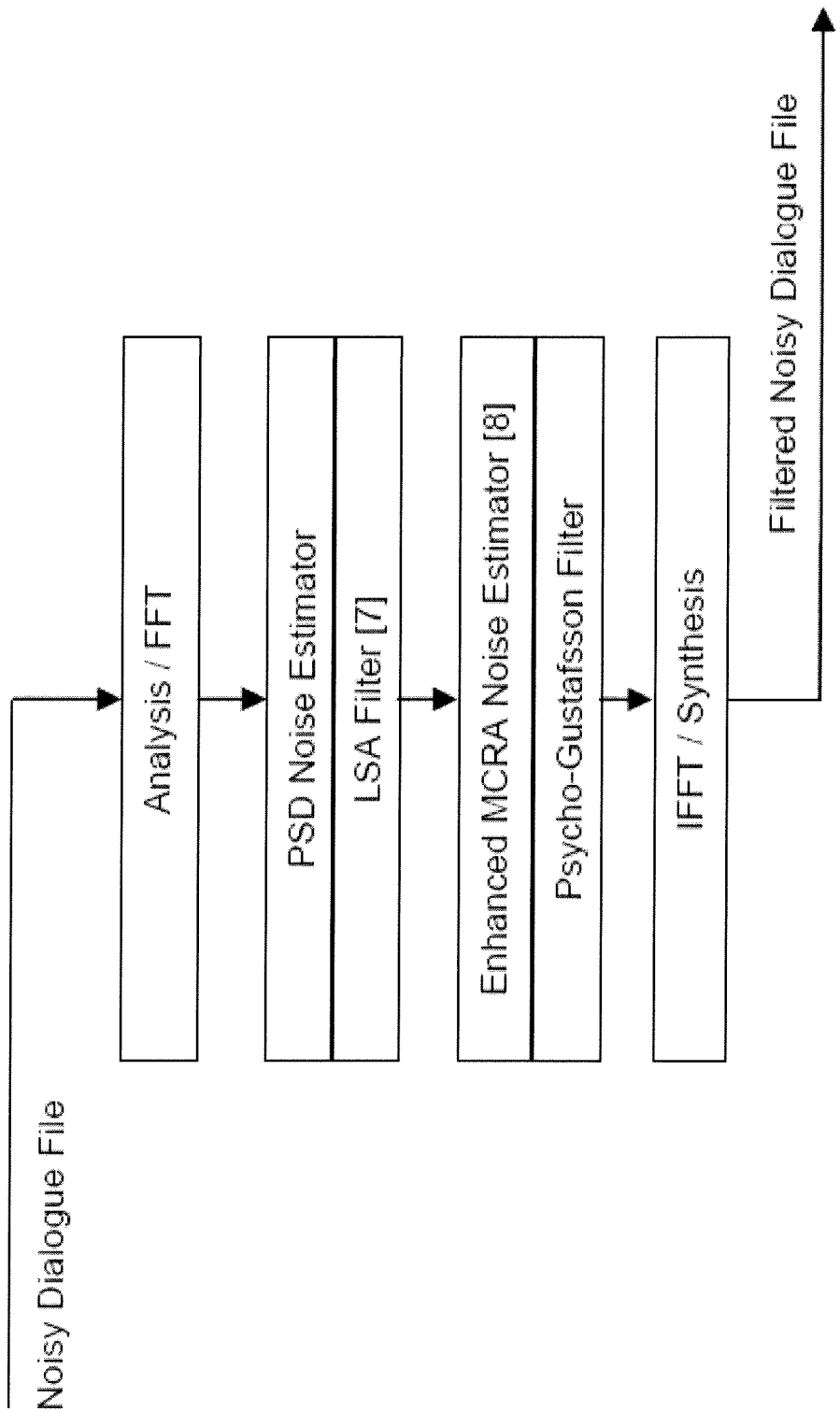
FIG. 4 illustrates a noise filtering method in accordance with an aspect of the present invention.

To handle noisy dialogue data, noise cancellation by filtering is applied. The following two stage cascade mono filter is used throughout the testing procedure as described in "Ningping Fan; "*Low distortion speech denoising using an adaptive parametric Wiener filter*", Proc. IEEE International Conference Acoustics Speech, and Signal Processing (ICASSP-04), Montreal, Canada, May 2004." The steps for noise removal in one embodiment of the present invention are illustrated in FIG. 4 which illustrates a composite cascade mono filter for noise removal. LSA filter [7] refers to "Ningping Fan; "*Low distortion speech denoising using an adaptive parametric Wiener filter*", Proc. IEEE International Conference Acoustics Speech, and Signal Processing (ICASSP-04), Montreal, Canada, May 2004."

Figure 5:
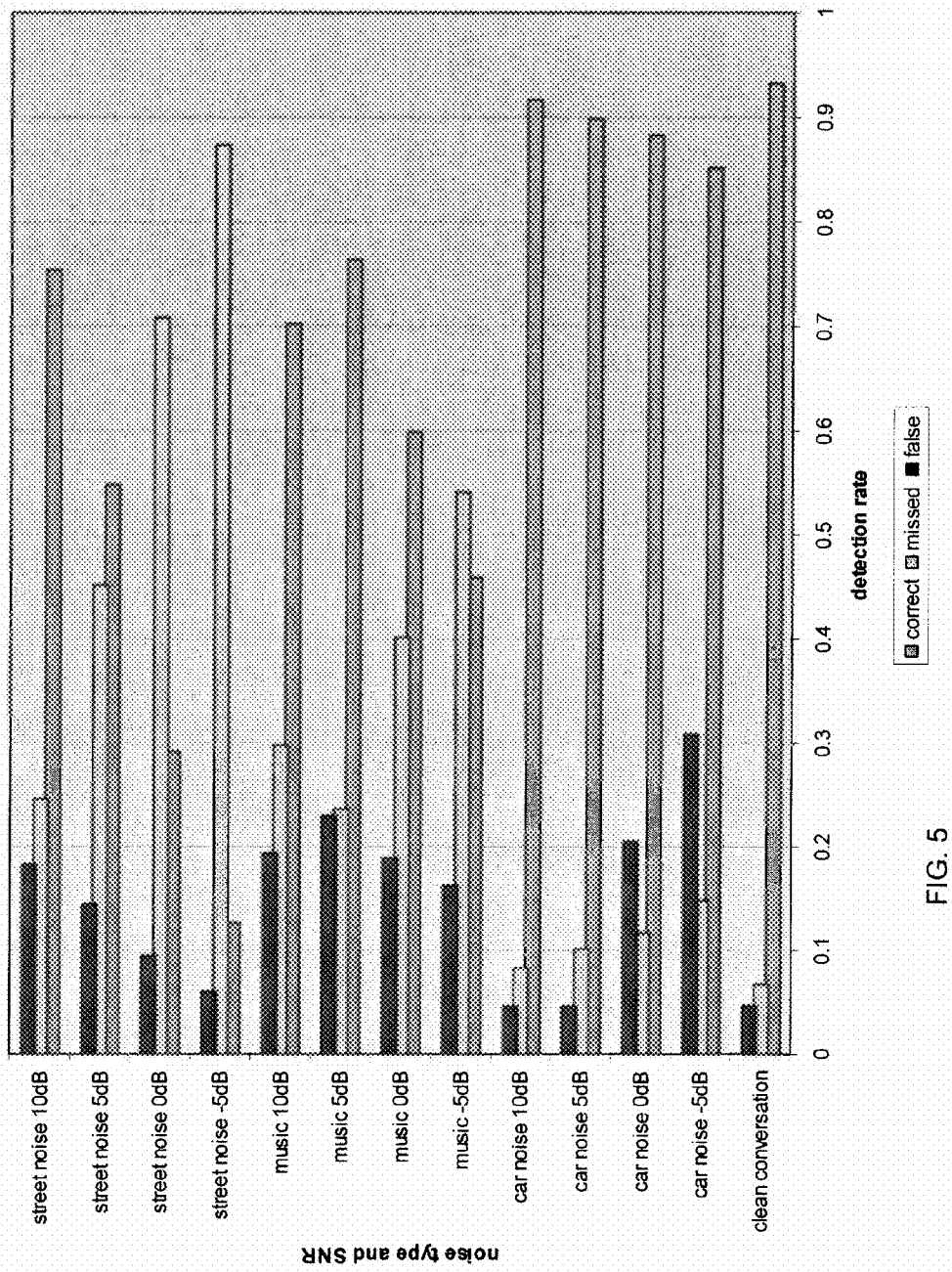
FIG. 5 illustrates yet another performance of a system in accordance with an aspect of the present invention.

An own voice recognition system (OVR) has been provided herein and has been tested in a first version. The test results are illustrated in FIG. 5 and shows test results from a first own voice detection system, OVR as provided herein. In FIG. 5, for each dB level, false detection is shown on top, missed detection is shown in the middle and correct detection is shown on the bottom. The classification threshold theta was fixed to 0.005 which approximately represents the equal error rate (EER) case for car noise and clean speech. The tests included new noise conditions such as music and street noise, and showed that a constant, non-adaptive classification threshold results in high miss rates of the system in some new noise conditions such as street scenarios.

The first version does not include silence detection, was not trained to deal explicitly with noise, had no real-time noise handling capability, and was tested mostly on clean speech and car noise scenarios. Classification was performed dependent on a fixed threshold theta that was obtained in experiments with clean speech and car noise distorted speech scenarios. The tests on new noise cases, such as music and street noise, indicated that this approach can sometimes result in high miss rates.

The aim of further aspects of the present invention, provided herein, is to analyze behavior and potential tune-up when trained under noisy conditions, and to provide automatic tuning in the real-time system dependent on the noise statistics in the input signals. This is targeted in first instance at narrowing the miss rates over all noise scenarios. One requirement was that the system should be tuned dependent on general noise statistics rather than particular noise cases. The intuition is that not all possible noise cases can be modeled but all noise cases can be described by their noise statistics.

Thus, such a system as provided herein below can address own voice recognition with unseen noise conditions.

Figure 6:
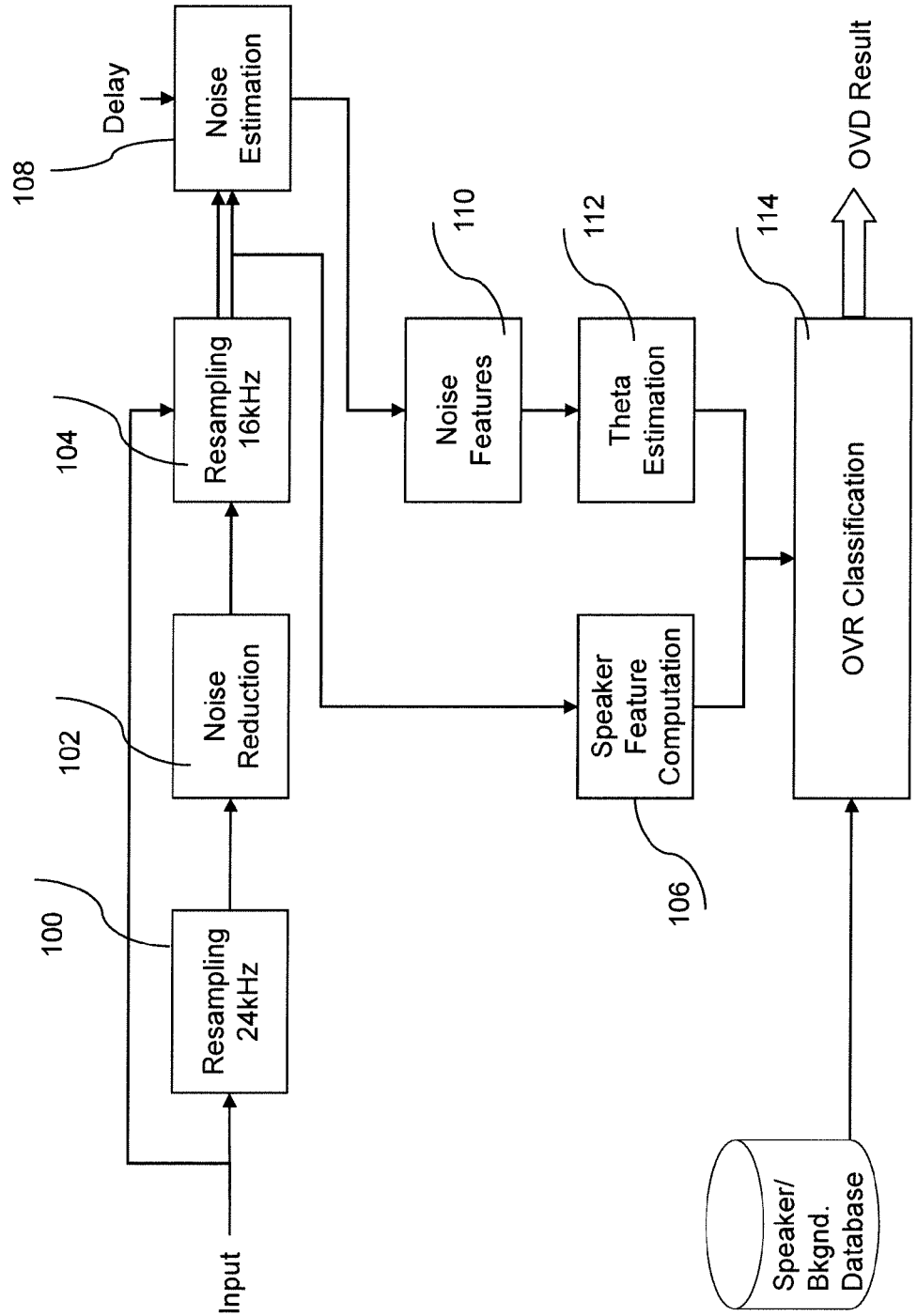
FIG. 6 illustrates a system in accordance with an aspect of the present invention.

In accordance with an aspect of the present invention the noise robustness of the system is improved by integration of a noise reduction component. Furthermore, the new system automatically adapts the classification threshold dependent on the noise statistics of the input. The new system design, in accordance with an aspect of the present invention, is illustrated in FIG. 6 and includes the noise reduction component, noise estimation, noise feature extraction and an adaptive classification threshold (theta) estimation component. The noise reduction component, is designed for sampling rates of 24 kHz while the own voice recognition assumes 16 kHz. However, the overall system should work for a number of different input frequencies. Therefore, the input sampling rate was adjusted before and after the noise filter of SAT.

The noise reduced signal is then passed to the speaker feature computation. In parallel, the noise signal is approximated as the difference of the delayed original input with the noise reduced input. This step is necessary for the subsequent noise feature extraction. The delay (see FIG. 6) was chosen to account for the actual time delay in the noise filter component of SAT. The signal-to-noise ratio (SNR) as well as a noise color feature, are extracted to represent the current noise statistics of the input. Thereafter, the classification threshold theta will be selected dependent on the position of these noise features in a previously learned feature space. The speaker features, input noise adapted theta and the speaker and background speaker database are then used to classify the input instance as either the voice of the person wearing the hearing aid or other external signals.

Referring to FIG. 6, in step 100, the signal received by a processor in a hearing aid is sampled at 24 kHz. Then in step 102 noise reduction is performed. Noise reduction can be performed by any noise reduction method that is adapted to speech signals and/or speech recognition. One such noise reduction method is disclosed in Ningping Fan; "*Low distortion speech denoising using an adaptive parametric Wiener filter*", Proc. IEEE International Conference Acoustics Speech, and Signal Processing (ICASSP-04), Montreal, Canada, May 2004, which is hereby incorporated by reference. In step 104, the signal is resampled at 16 kHz. The output of the 16 kHz sampled signal is provided to a speaker feature computation in step 106 where features of the detected speech are detected. Another output of the 16 kHz sampled signal is provided to a noise estimation step 108. In step 108 the noise signal is approximated as the difference of the delayed original input with the noise reduced input. This step is necessary for the subsequent noise feature extraction in step 110. The delay can be chosen to account for the actual time delay in the noise reduction component and can be between 0.0625 msec (one sample delay) and 500 msec. In step 110, noise features are extracted. In step 112, a theta estimation is made.

In step 114 own voice classification occurs. Data from a speaker database is provided and the speaker feature and the theta estimation are used to set a detection threshold in step 114.

Noise Features

The term $x^t(i) \in R$ denotes the ith component of the input vector number t, i=1 ... M. Furthermore, bold letters are used to represent vectors or matrixes. The current version of the noise feature extraction component uses M=16128 samples in each of the t input vectors. Consecutive input vectors t and t+1 do not overlap. The goal of the noise feature selection is to find abstract features that capture both the noise type and intensity and can be used to classify the known noise conditions. That is, the variance of the estimate should be small over different time instances and there should be a clear distinction in the feature space between cases of different 'optimal' thetas. Note that only the test database of SAT was available as source for music and street noise conditions. Therefore, this database was used to estimate the noise statistic dependent EER theta values.

As previously discussed, given a input vector size M, the noise $n \in R^{1 \times M}$, is estimated as the difference between the by d samples delayed input signal $x \in R^{1 \times M}$ and the cleaned signal $s \in R^{1 \times M}$:

$$n(i) = x(i-d) - s(i) \tag{4}$$

This is only an approximation of the noise in the input x. Also, there should be continuity between theta estimates of following time instances. To achieve this, the features are smoothed over time. For the SNR estimate, the smoothing was performed in both signal power and noise power domain. Given an innovation rate a and the input instance t, the signal power $S^t$ and noise power $N^t$ are computed as:

$$S^t = \alpha \sum_{i=1}^{M} s^t(i)^2 + (1-\alpha)S^{t-1} \text{ and} \tag{5}$$

$$N^t = \alpha \sum_{i=1}^{M} n^t(i)^2 + (1-\alpha)N^{t-1} \text{ respectively.} \tag{6}$$

The final SNR estimate of the current input instance t is given by:

$$z_{SNR} = 10 \log_{10}\left(\frac{S^t}{N^t}\right) \tag{7}$$

Figure 7A:
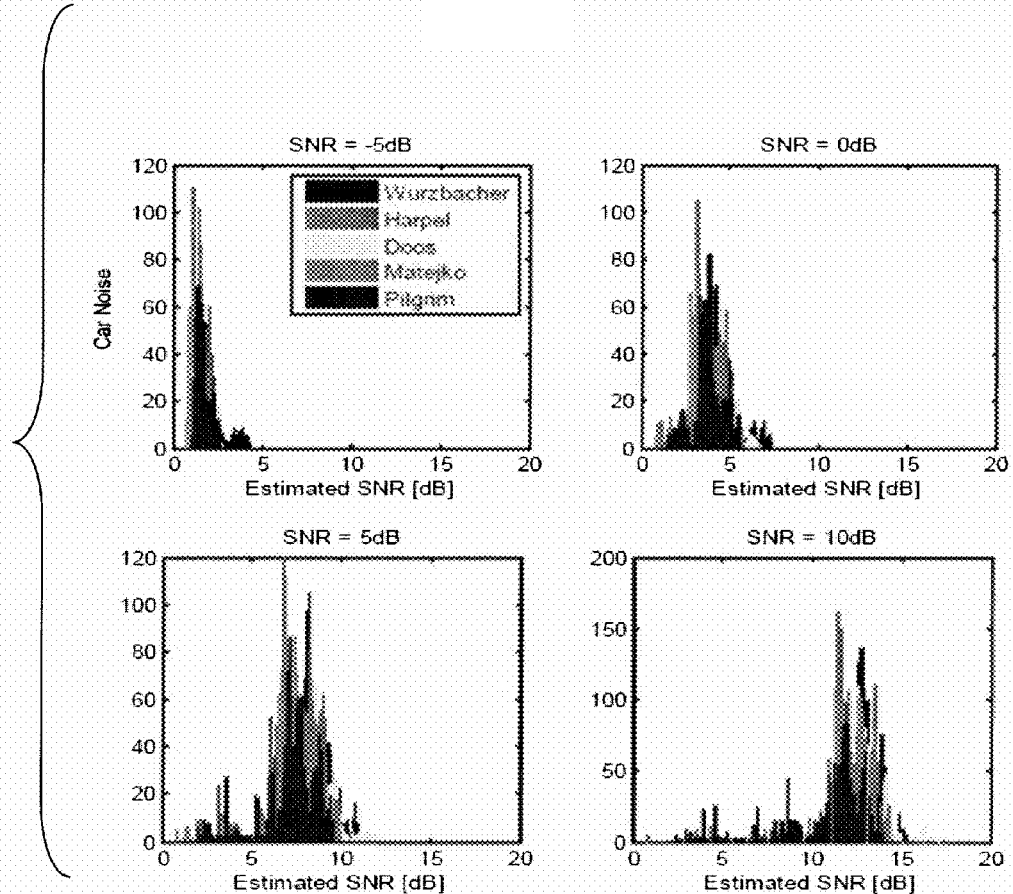
FIGS. 7a, 7b and 7c illustrate yet another performance of a system in accordance with an aspect of the present invention.
Figure 7B:
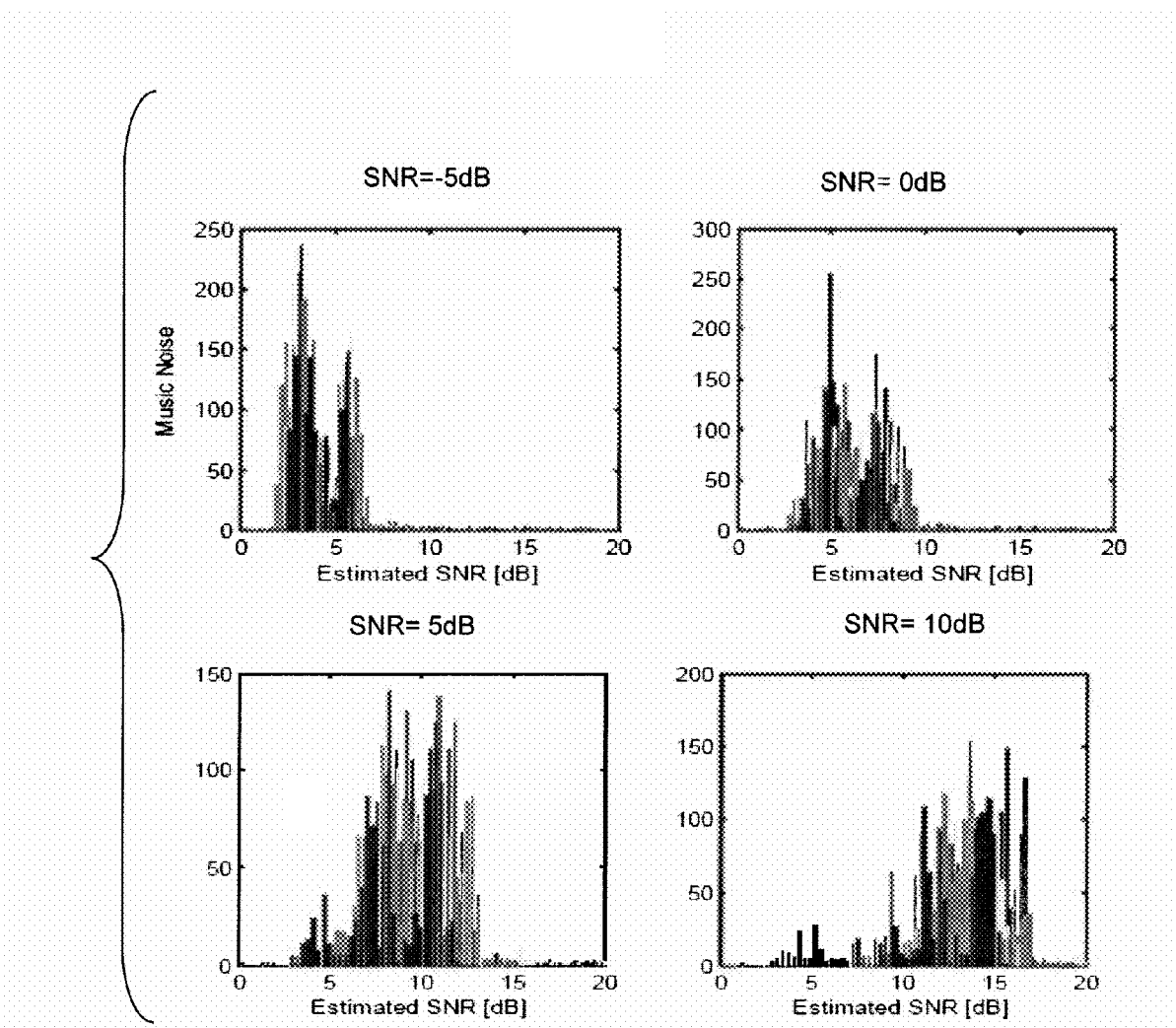
Figure 7C:
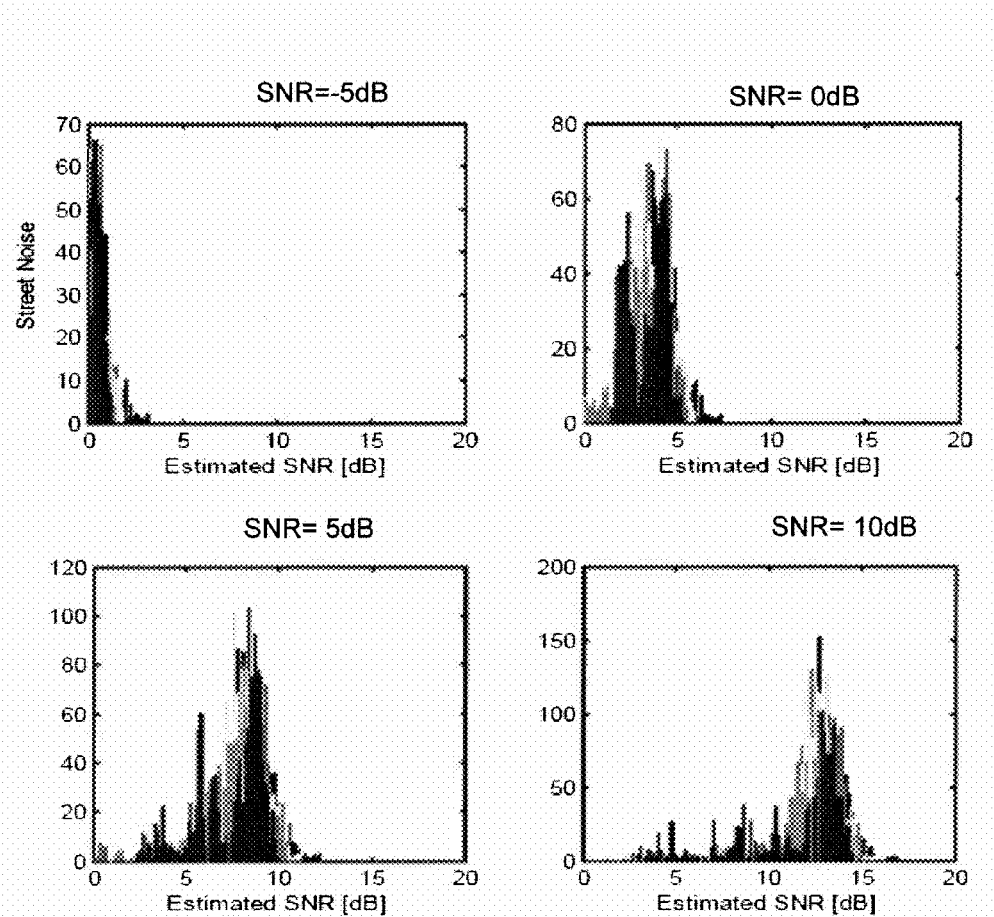

FIGS. 7a, 7b and 7c show an evaluation of the selected SNR estimate feature. The estimated SNR is only a relative measure for the real SNR and is dependent on the noise type. However, the distributions of different noise types are separate in this domain while they are similar for different speakers. Thus this feature seems promising for the following prediction of EER theta values. Histograms of the signal to noise ratio are estimates for different noise types, correct SNRs and speakers. The noise type is varied for each histogram in a figure and the correct SNR for each figure. The SNR estimate is dependent on the noise type and only provides a relative measure for the correct SNR value. The distributions of estimated SNRs are similar for different speakers. The innovation parameter a of the displayed experiment was selected as 0.01.

A second noise feature, called noise color, was designed to distinguish between the different noise types. Experiments show that street noise, music and car noise are well separated by their contribution to the energy distribution over the range of frequencies. That is, while most of the energy in the car noise case is concentrated in the lower frequencies, street noise has a broad band contribution. In a first step, the noise power is normalized to provide a signal energy independent measure:

$$N^t = \mathit{fft}(n^t) \quad (8)$$

$$E^t(i) = \frac{N^t(i) \cdot conj(N^t(i))}{\frac{1}{M}\sum_{i=1}^{M}(N^t(i) \cdot conj(N^t(i)))} \quad (9)$$

To model the impact of the noise color on the Mel-frequency cepstral coefficients (MFCC) based features, the spectral noise power $E^t$ is segmented by K mel-like triangular windows given in the matrix $M \in R^{M \times K}$:

$$P^t = E^t \cdot M \quad (10)$$

One illustrative implementation uses K=24 mel-like windows. Thereafter, the noise color estimate C is obtained using an entropy measure:

$$C = -\sum_{k=1}^{K} P^t(k) \log_2 P^t(k) \quad (11)$$

The final noise color estimate is obtained by smoothing over multiple input windows:

$$C^t = \alpha C + (1-\alpha)C^{t-1} \quad (12)$$

Figure 8A:
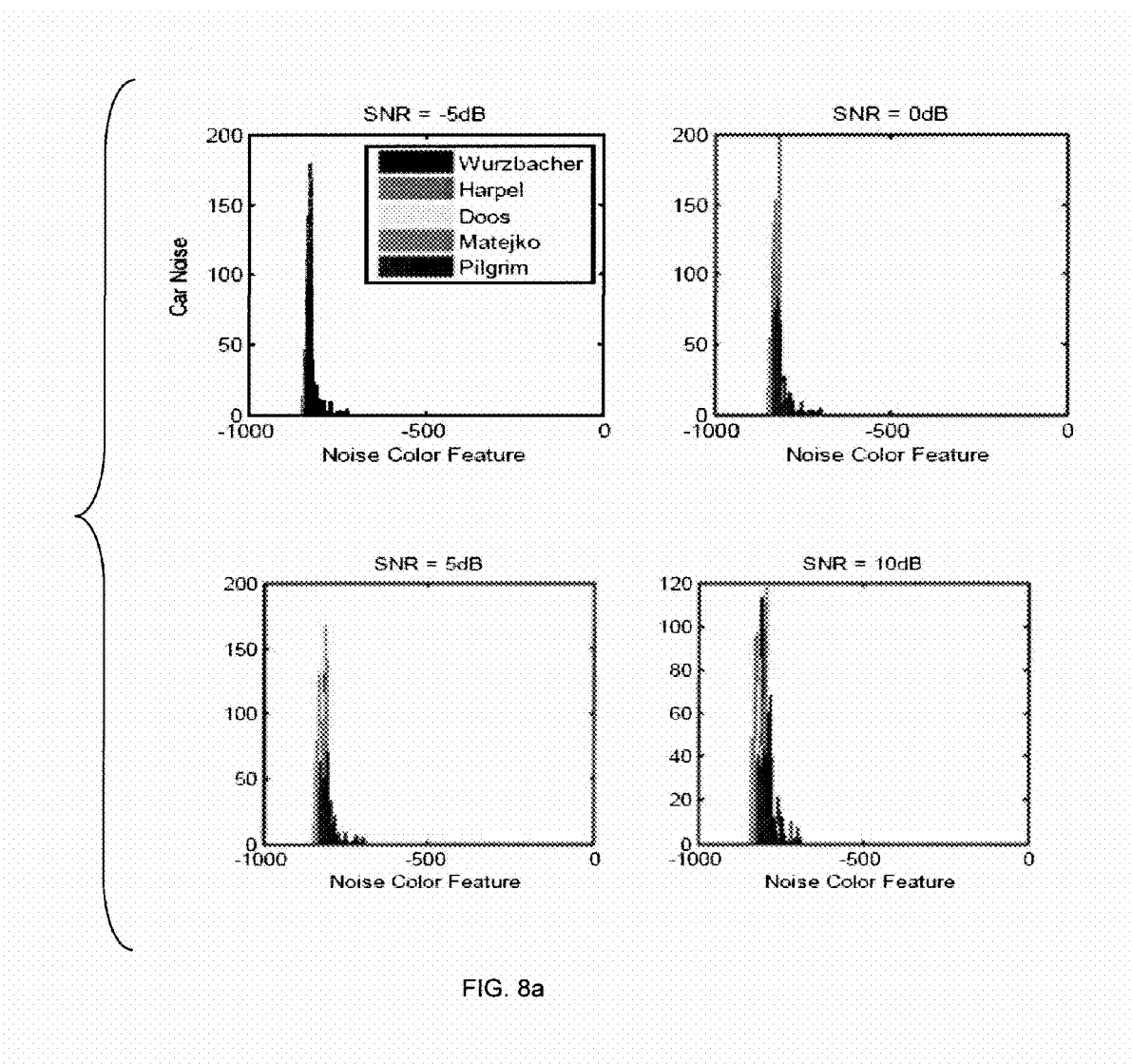
FIGS. 8a, 8b and 8c illustrate yet another performance of a system in accordance with an aspect of the present invention.
Figure 8B:
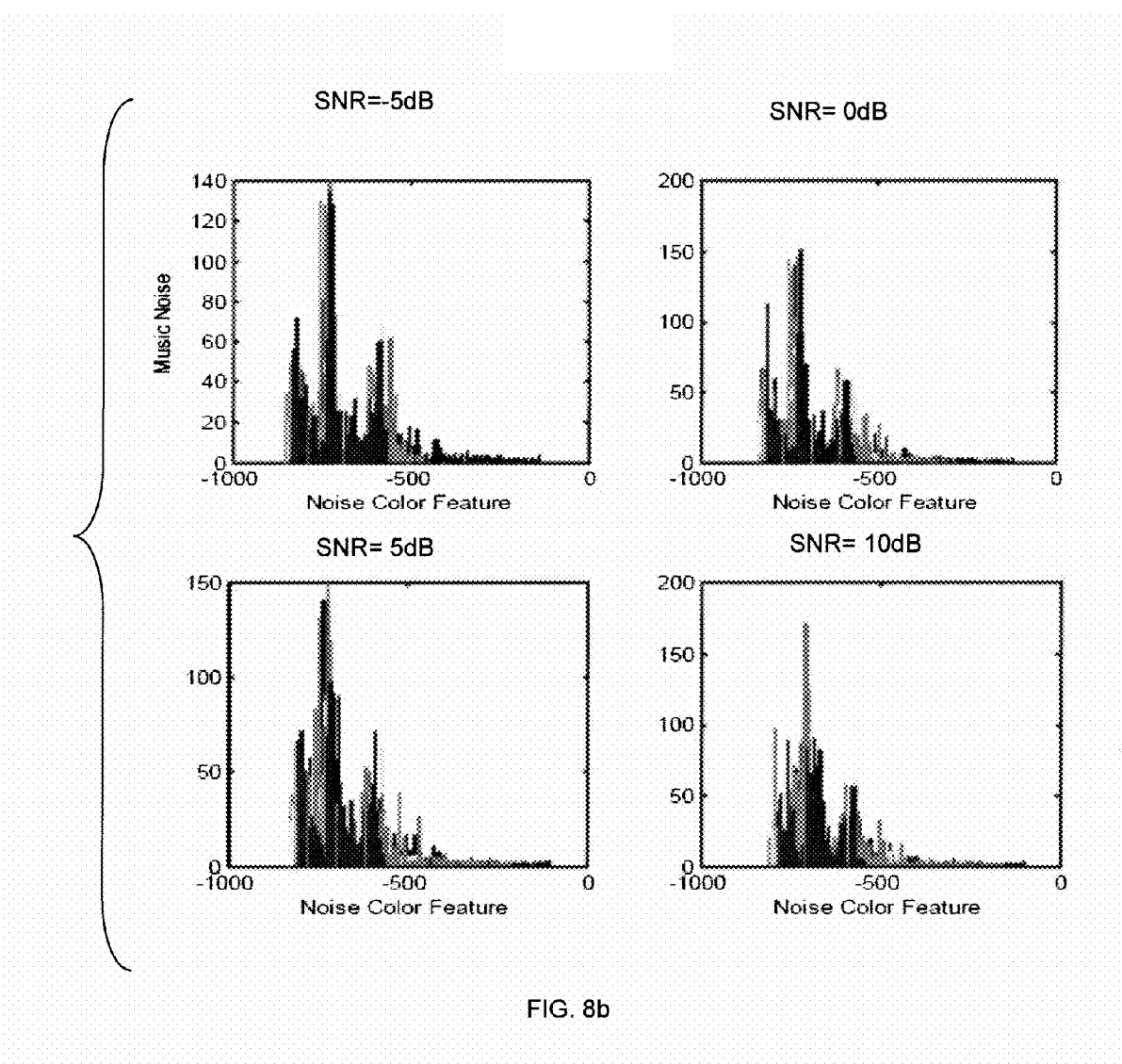
Figure 8C:
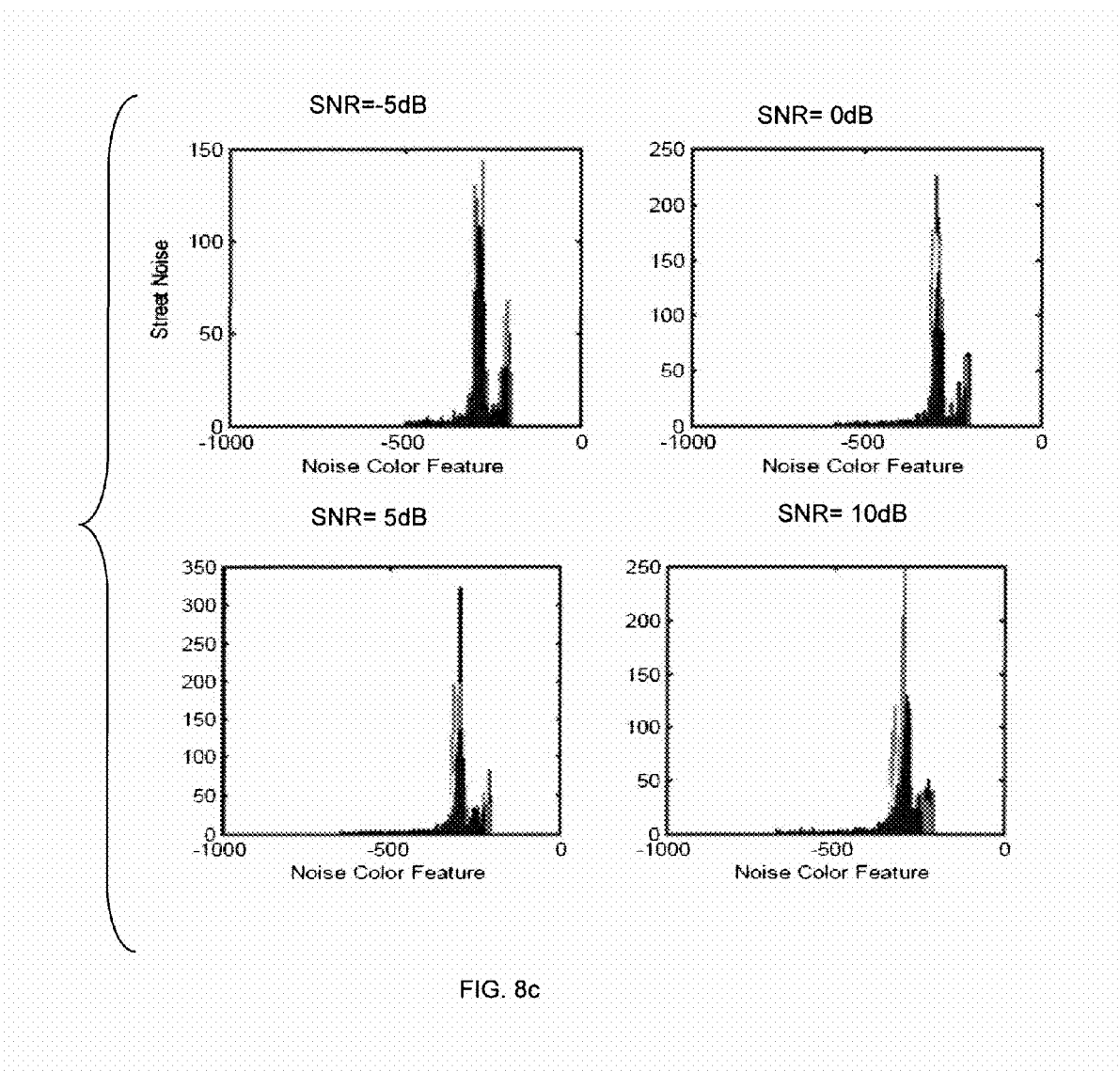

FIGS. 8a, 8b and 8c show the resulting histograms of the noise color feature for different speakers, SNRs and noise types. Histograms of the noise color estimates for different noise types. SNRs and speakers. The noise type is varied for each of the FIGS. 8a, 8b and 8c and the correct SNR. Note that the distributions are independent on the speaker and SNR but clearly distinguish between the noise cases. The innovation parameter α of the displayed experiment was set to 0.01. The noise color increases with the bandwidth of the noise. That is, while the low frequency car noise results in a noise color feature of approximately −800, the broadband street noise case results in values around −300. The color feature varies broadly for the music noise scenario. The reason is that different types of music are used to distort each recording. It is the intuition that this noise color feature is a valuable measure of the noise type.

It may be undesirable (e.g., out of computational reasons) to perform a Fourier transform of M=16128 samples. In this case, the Fourier operation can be replaced by computing the signal energies after K predefined band pass filters in the time domain.

In the above provided approach, in accordance with an aspect of the present invention, the noise signal is a reconstructed noise signal which is characterized by two noise features (SNR and noise color). It will be shown below that a detection threshold can be estimated based of the noise features. In a further embodiment of the present invention one may generate a single noise characterization or noise feature. Such a single feature in certain noise conditions is sufficient to select an appropriate detection threshold. In yet a further embodiment of the present invention also more than two noise characterizations may be used to estimate a detection threshold.

Theta Estimation

In accordance with an aspect of the present invention it is provided how the noise features are used to predict future classification thresholds theta. As the testing database was used to learn the noise statistics dependent EER theta values, it is important to abstract these results to minimize the fit to the particular test cases. Therefore, only a single value was used to represent each test scenario of all speakers in the feature space. The selected point was the median value over time and speakers.

Figure 9:
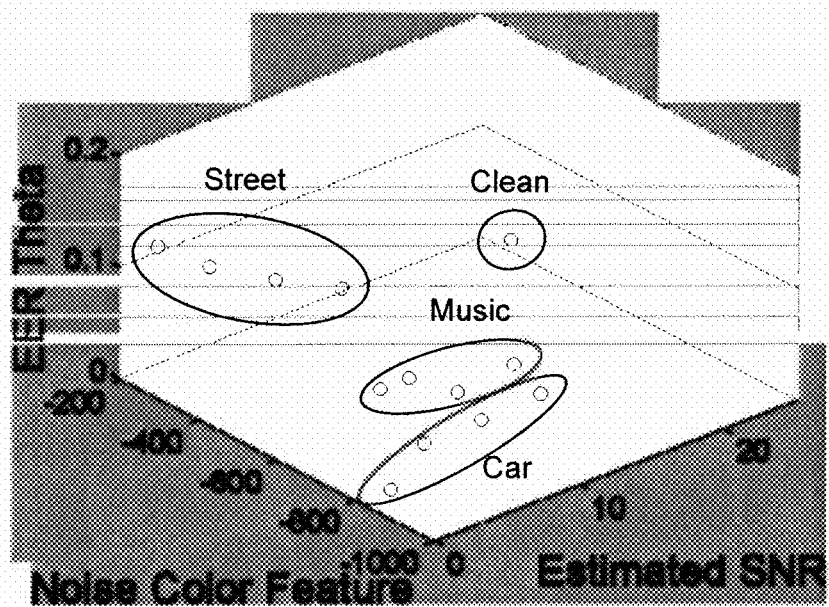
FIGS. 9-11 illustrate a detection space in accordance with one or more aspects of the present invention.

FIG. 9 shows this compressed view of the relationship between the extracted noise statistics and the EER theta value and illustrates a relationship between the noise features and the EER theta value for each noise type and SNR. The values are the averages over time and over different speakers. The different noise scenarios actually used constitute disjoint clusters in this feature space. The different noise types separate in disjoint clusters. This indicates that the selected noise features can be used to model and predict theta. The displayed points are the support for the design of this theta predictor.

Figure 10:
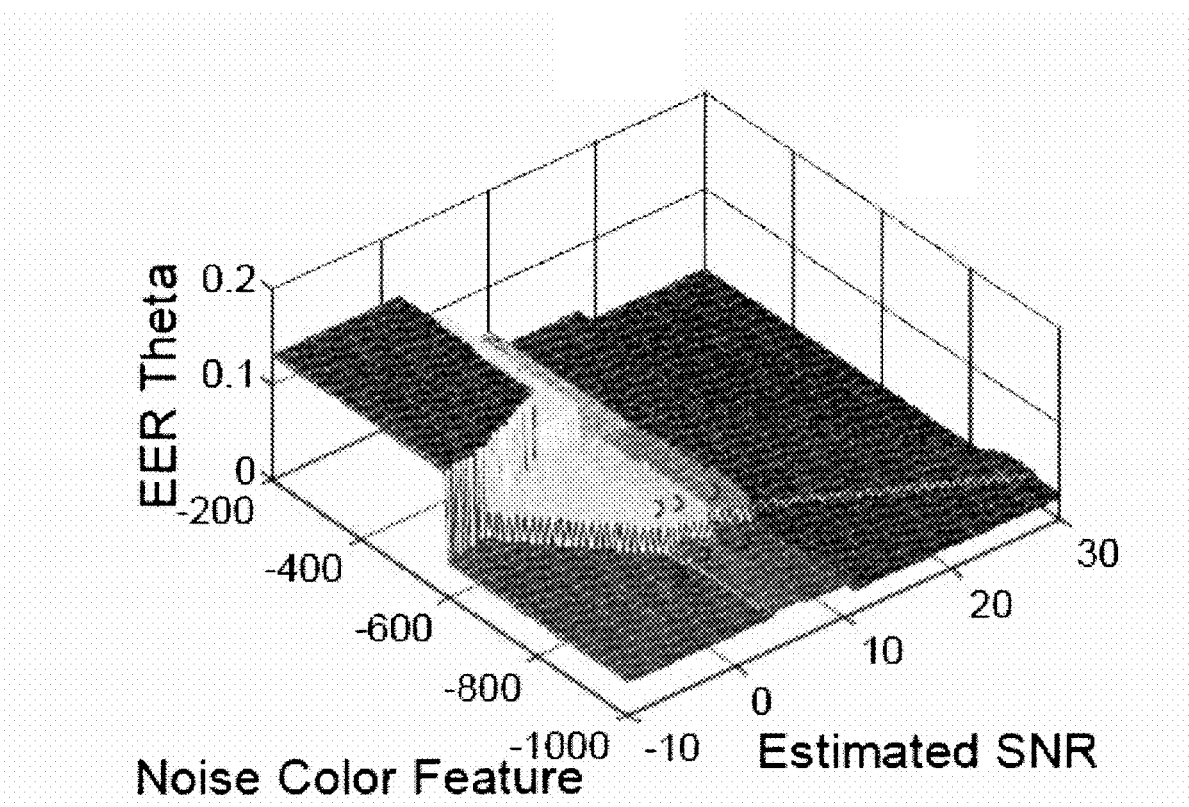

In a first step, the EER theta prediction relies on the modeling of the 2D feature space (SNR, Noise Color) with a Voronoi tessellation as described in "Georgy Voronoi (1907). *Nouvelles applications des parametres confirms a la theorie des formes quadratiques*. Journal fur die Reine und i\ngewandte Mathematik, 133:97178, 1907" and "Gustav Lejeune Dirichlet (1850). Ueber die Reduktion der positiven quadratischen Formen mit drei unbestimmten ganzen Zahlen. Journal fuer die Reine und angewandte Mathematik, 40:209-227." FIG. 10 shows Voronoi tessellation to interpolate and extrapolate new theta values based on the learned support in the feature space. This approach results in discontinuities in the theta values. This method segments the 2D feature space into a number of cells (convex polygons). The number of cells is given by the number of provided training point. The boundaries of the cells are defined such that each of its enclosed elements has the same training point as nearest neighbor in the feature space. The theta value of a training point is assigned to (new) points that fall in its respective cell. To assign equal weight/importance to both noise features, their scaling is aligned prior to this nearest neighbor search. The resulting surface of this extrapolation is illustrated in FIG. 10.

Figure 11:
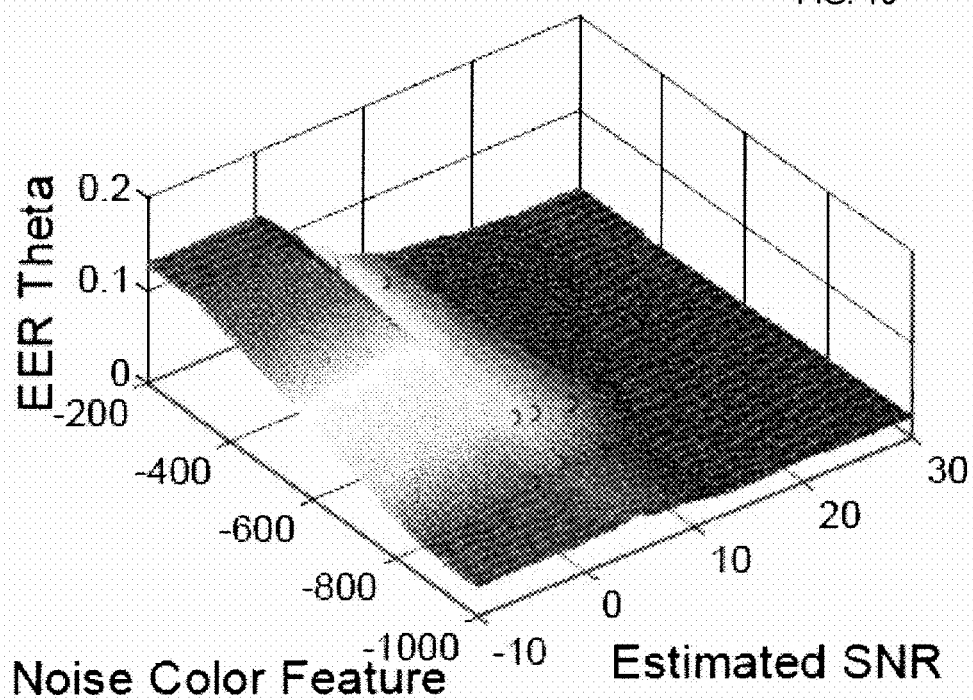

An apparent disadvantage of this approach consists in the discontinuities between different theta values (and regions). This could result in abrupt and frequent changes in a theta estimate at boundaries between regions. FIG. 11 shows a model for theta estimation that interpolates linearly between the training points in the feature space. The linear interpolation and extrapolation of new theta values is based on the learned support in the feature space. The extrapolation estimates theta with the same value as the closest point on the circumference around the training data. The extrapolation uses the theta value of the point that is closest on the circumference around the training data.

Figure 12A:
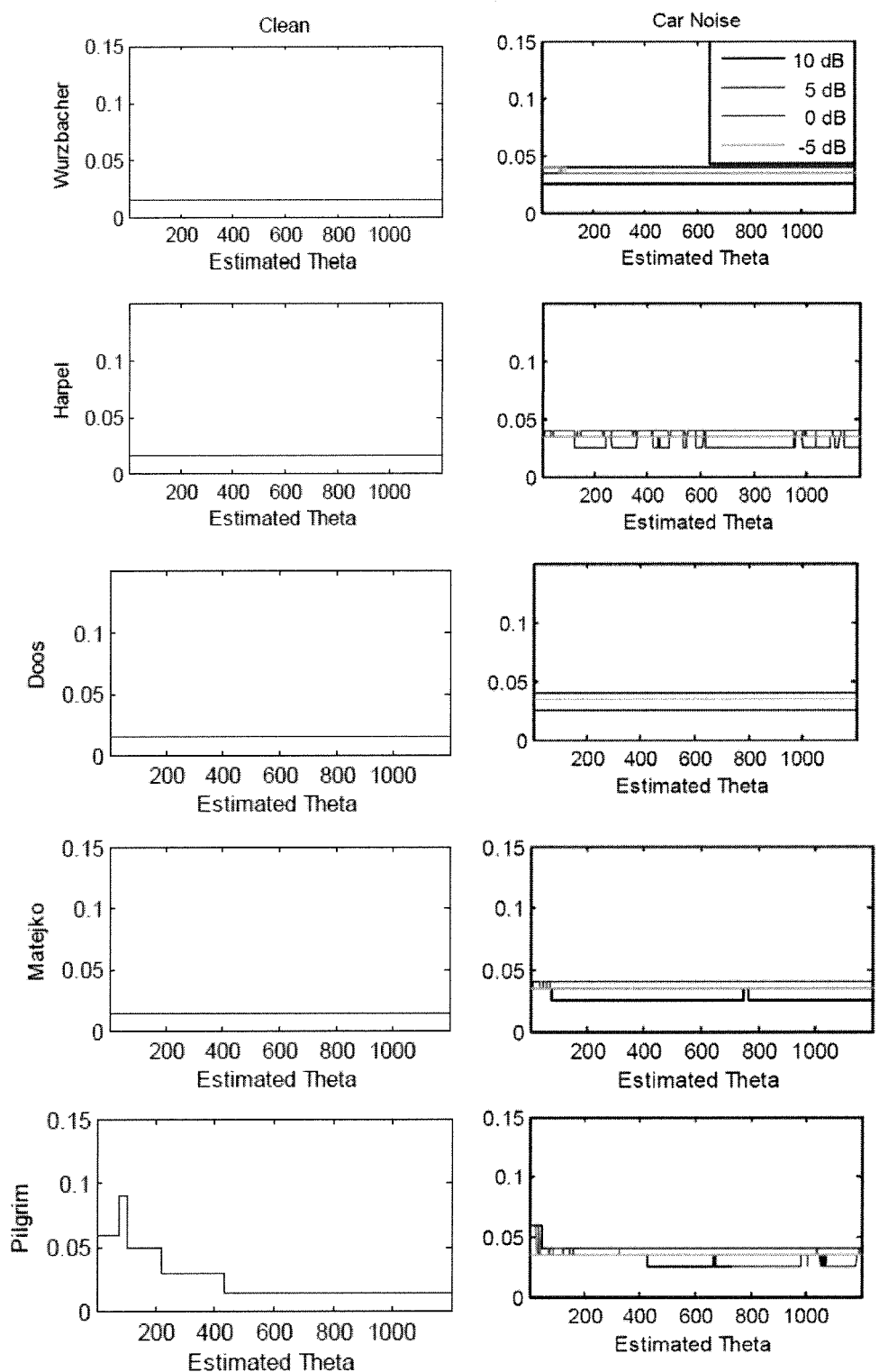
FIGS. 12a, and 12b, illustrate yet another performance of a system in accordance with an aspect of the present invention.
Figure 12B:
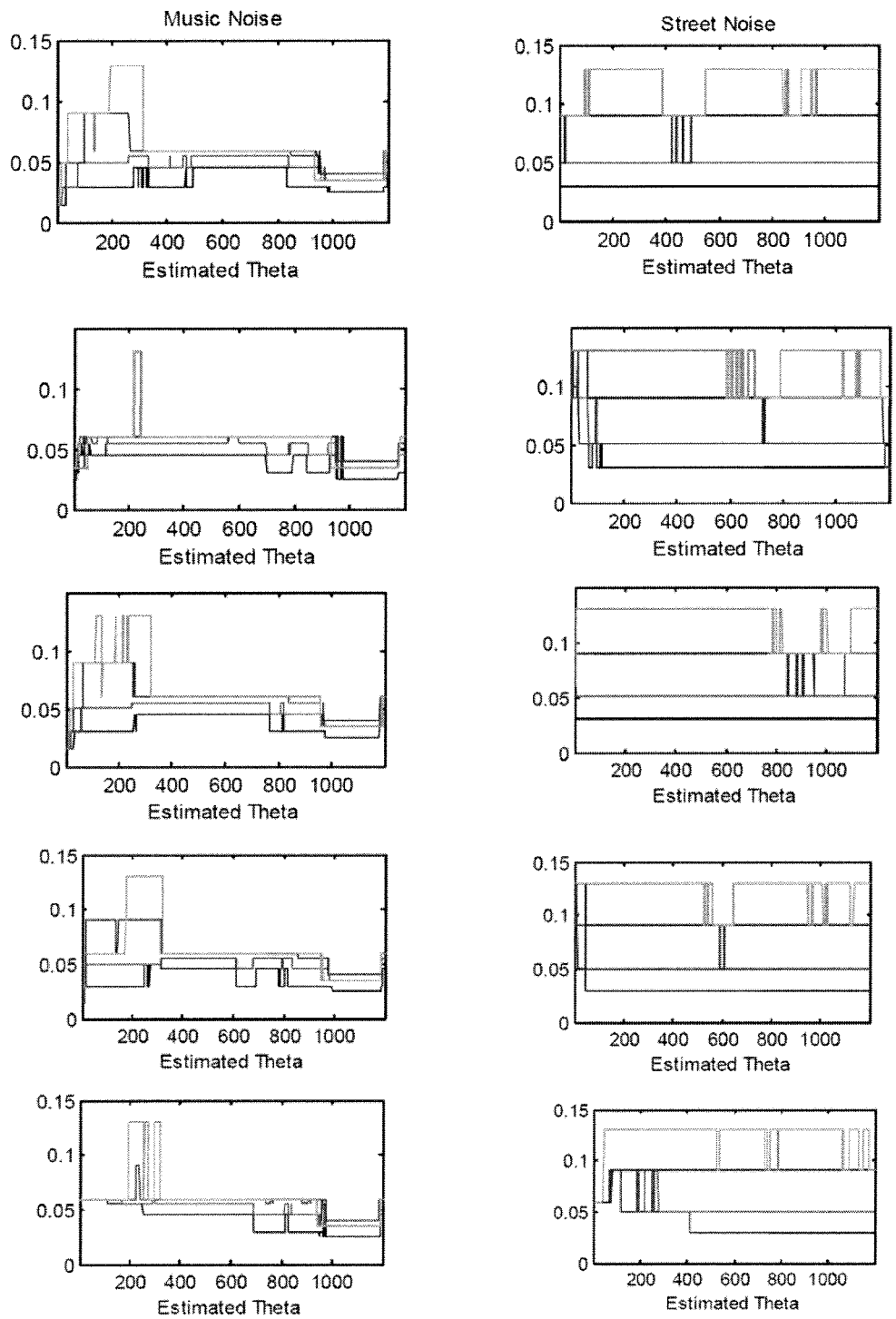
Figure 13A:
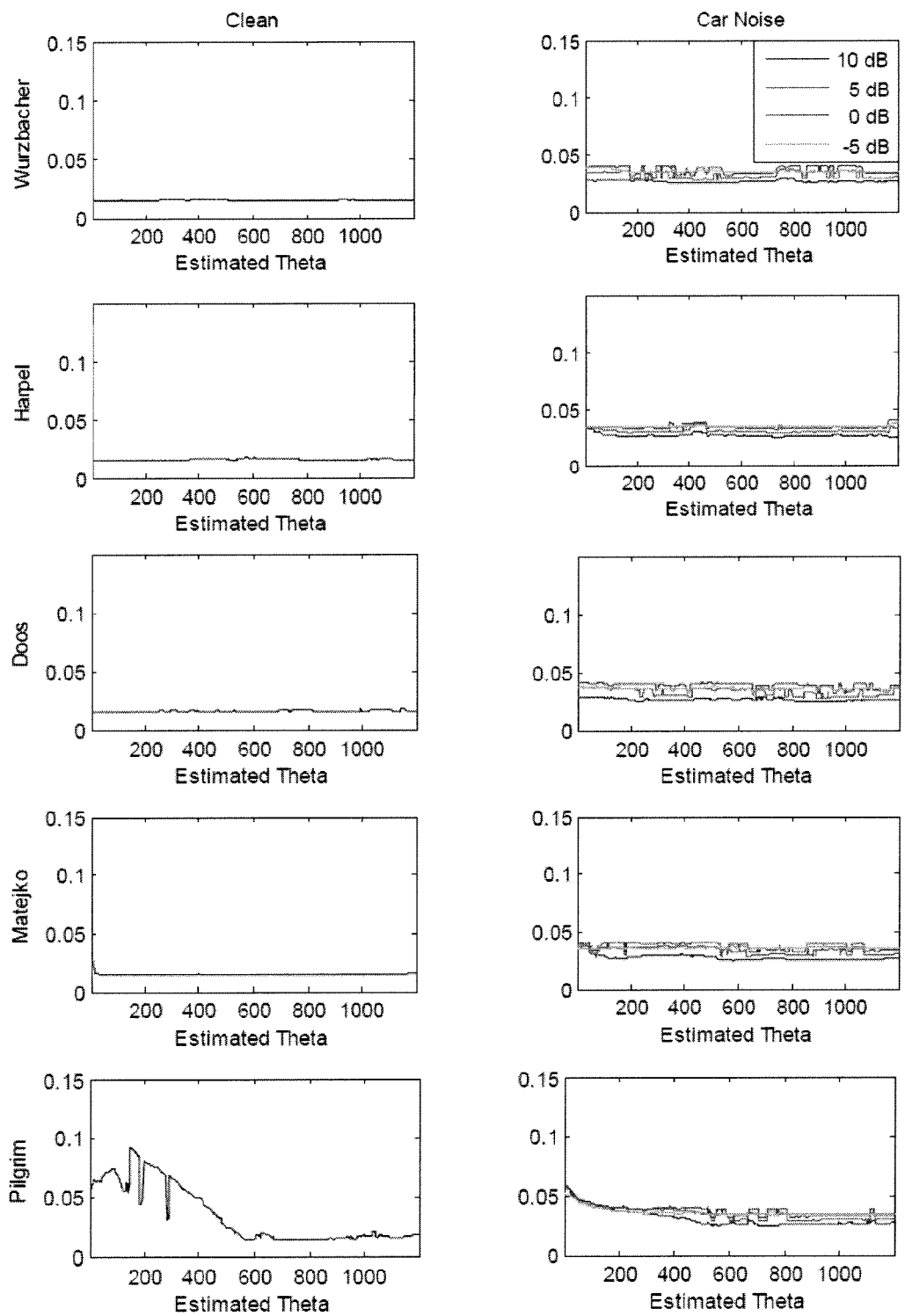
FIGS. 13a and 13b, illustrate yet another performance of a system in accordance with an aspect of the present invention.
Figure 13B:
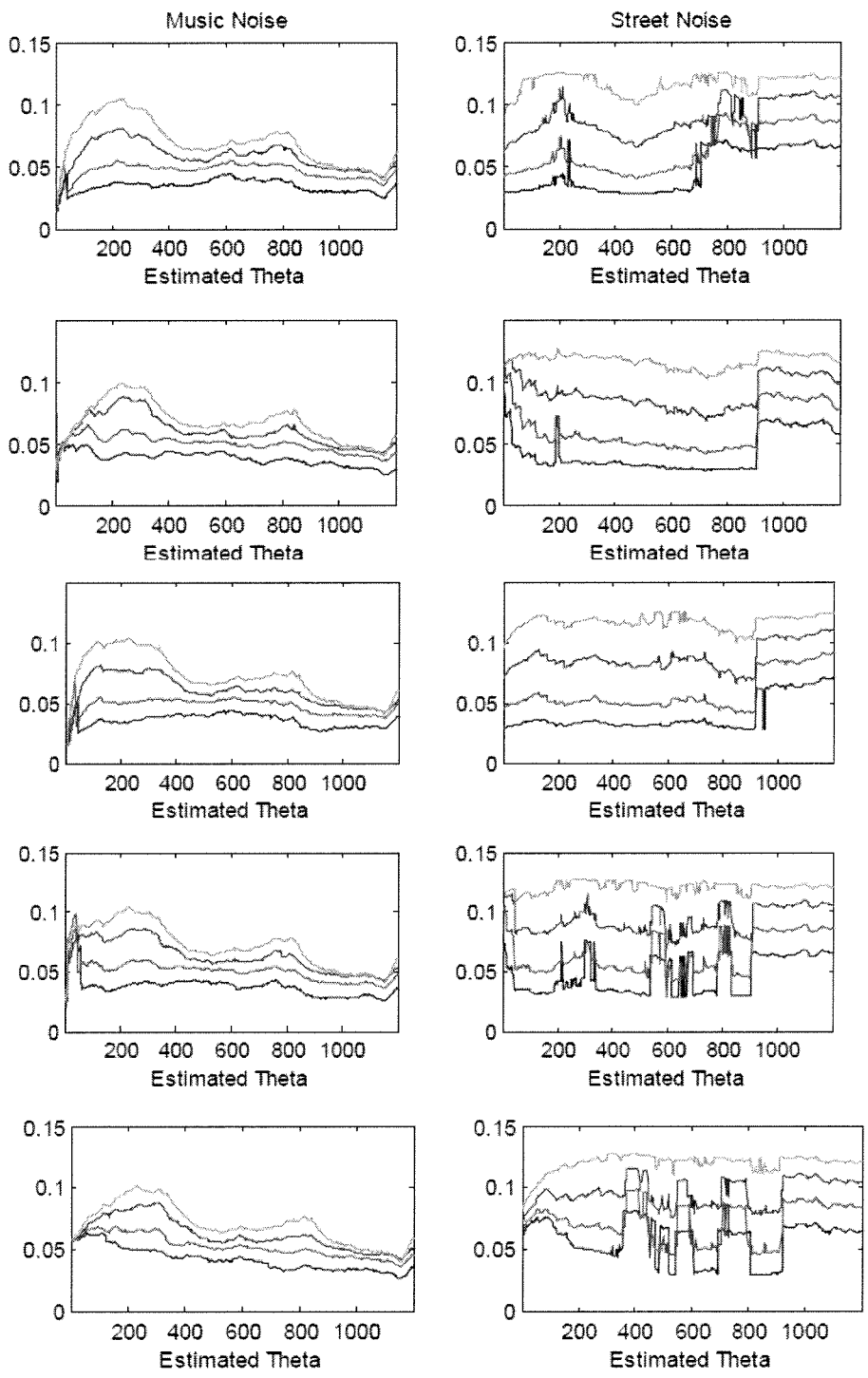

FIGS. 12a and 12b illustrate an evaluation of the designed theta estimation procedure using the Voronoi tessellation model shown in FIG. 10. The input was classified on a second by second basis. The results align well with the desired EER theta values. FIGS. 13a, and 13b illustrate an evaluation of the designed theta estimation procedure for different people, SNRs and noise types using the linear interpolation model illustrated in FIG. 11. The input was classified on a second by second basis. The results are smooth and align well with the desired EER theta values.

The database used to learn the EER theta values for the design of the theta prediction model was of limited size. It can be expected that additional recordings, including e.g., new noise conditions, could be used to refine this model. To enable this flexibility, the training points are loaded from an external parameter file with the name "Settings_EER_Theta.txt" located in the directory of the OVR application. The content of this file is illustrated in Table 1. The first column of this table represents the feature names. The value of the Noise_Color is given as entropy of different noise energy bands, the SNR_Est in dB and the EER_Theta represents a dimensionless threshold. The prediction surface is automatically generated from the points provided in this file. Thus tuning and extension of the current model is possible by changing or adding values in the list. In general, increasing theta will bias towards making more false alarms and fewer missed detections. Decreasing theta will bias towards making fewer false alarms and more missed detections.

TABLE 1

Current training points for theta estimation stored in "Settings_EER_Theta.txt"

| Noise_Color | SNR_Est | EER_Theta | |
|---|---|---|---|
| −343.6642 | 23.068 | 0.0150 | } Clean Speech |
| −821.4180 | 12.603 | 0.0250 | |
| −825.6489 | 8.1616 | 0.0350 | |
| −827.3340 | 4.2318 | 0.0400 | } Car Noise |
| −833.5761 | 1.6648 | 0.0350 | |
| −662.4929 | 13.683 | 0.0300 | |
| −661.2156 | 9.4427 | 0.0450 | |
| −652.4952 | 5.7468 | 0.0550 | } Music |
| −645.5330 | 3.7681 | 0.0600 | |
| −347.8544 | 12.771 | 0.0300 | |
| −352.5012 | 8.1381 | 0.0500 | |
| −345.7764 | 3.5556 | 0.0900 | } Street Noise |
| −338.1818 | 0.2187 | 0.1300 | |

Test Results

Figure 14:
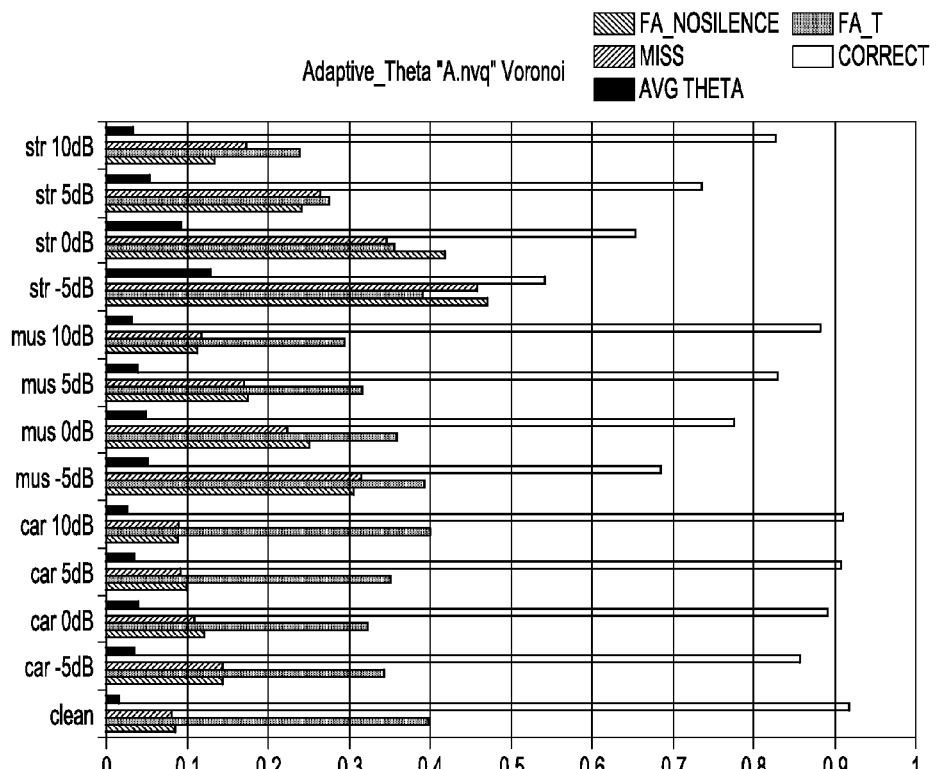
FIG. 14 illustrates yet another performance of a system in accordance with an aspect of the present invention.

FIG. 14 illustrates the results of the adaptive theta estimation using the Voronoi tessellation approach. The similarity between the miss rate and the false acceptance rate (FA) during non-silence indicates that this approach is well suited to operate in the EER condition independent of the selected SNR and noise type. The new system clearly outperforms the tested version of which test results are shown in FIG. 5. This is especially visible in the street noise case. The training database used to generate these results was different than the one used to generate the results shown in FIG. 5. The next section details the differences in these two training methods, and it also explores several other training methods that were considered.

Impact of Training

Several training methodologies are provided and their impacts are observed on overall results.

The primary variable elements are:

Noise being added to training data

Level (SNR) of noise added to training data

Denoising of all training data (including already clean data) vs. denoising of only noisy training data.

These elements are embodied in the following training scenarios, whose names (arbitrarily chosen) are shown in quotations. The terms "20 dB and 30 dB" refer to the amount of noise mixed with the original clean training files. A "noise database" was used that contains pure noise files of type: fan, car, street, cafeteria. For a training database labeled as "20 dB", this means that for each original (clean) training file, we additively mixed it with each of the aforementioned four noise types such that the overall SNR (between the original file and the added noise) was 20 dB. These "mixed" training files were then passed through the SAT denoising filter before being used as input to build the training database (e.g. feature extraction and vector quantization).

"W": 20 dB Noise in training data (UO+LO, LI, L2, L3, plus 20 dB fan, car, street, cafeteria for each). All training data passed through SAT denoising filter before training "X": 30 dB Noise in training data (UO+LO, LI, L2, L3, plus 30 dB fan, car, street, cafeteria for each). All training data passed through SAT denoising filter before training "A": 30 dB Noise in training data (UO+LO, plus 30 dB fan, car, street, cafeteria for each). All training data, except clean files (no noise added), passed through SAT denoising filter before training "S: No noise in training data (UO+LO), no denoising of training data. These are the training databases provided by SAT, but with all person names replaced by numbers.

Figure 15A:
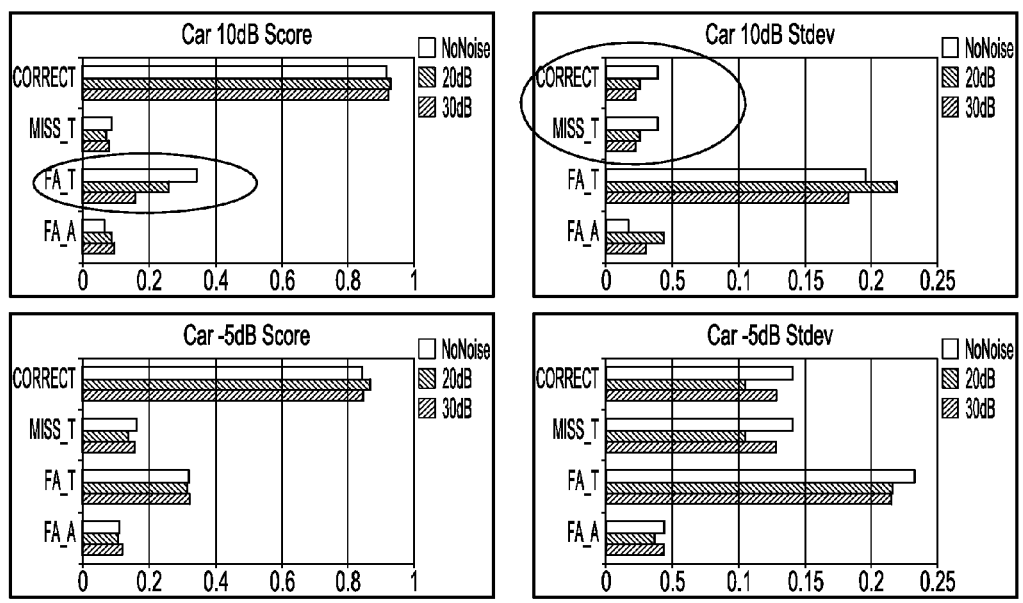
FIGS. 15a, 15b and 15c illustrate yet another performance of a system in accordance with an aspect of the present invention.
Figure 15B:
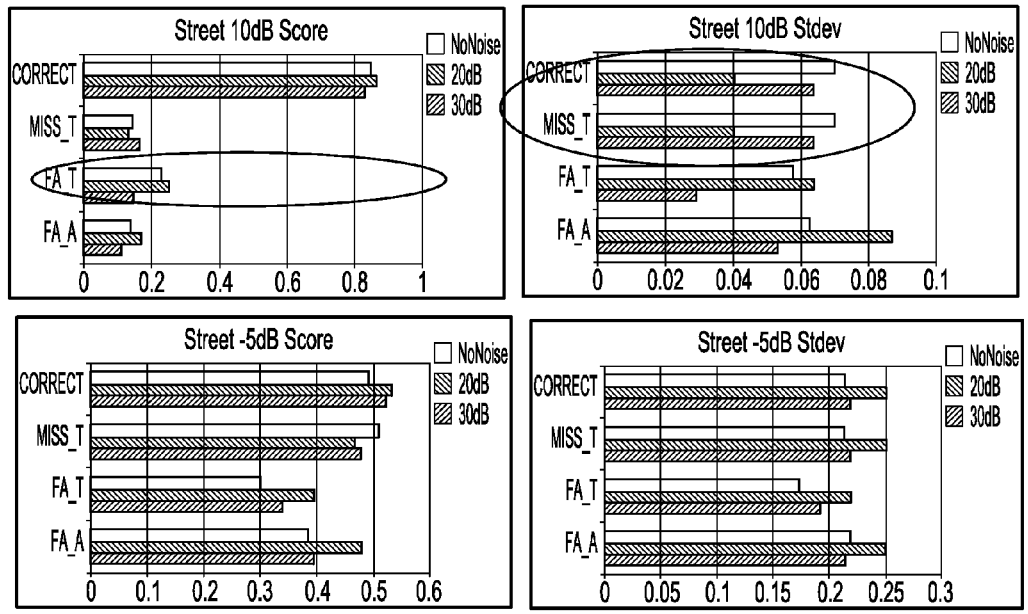
Figure 15C:
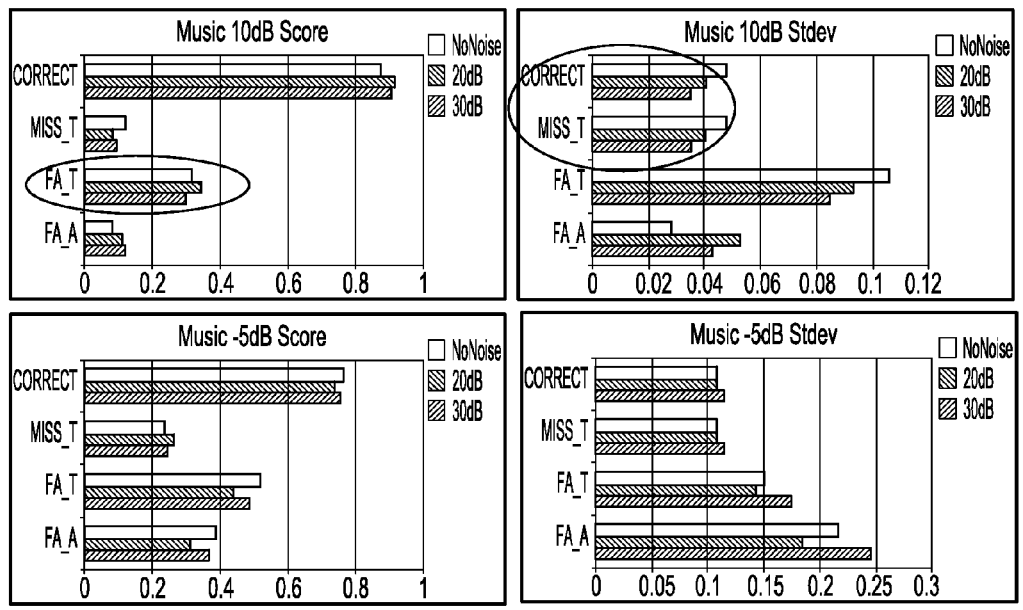

FIGS. 15a, 15b and 15c show the score and standard deviation for 3 different noise scenarios at the two extreme SNR levels under three different training scenarios (no noise ("SAT"), 20 dB noise ("W"), and 30 dB noise ("X")). Overall, the results indicate that using noise in the training process reduces the standard deviation of missed detections (and hence correct detections), and it also reduces false alarms during silence periods. These effects only seem to be prominent under test scenarios with high SNR (e.g. 10 dB), and they steadily diminish as the test SNR approaches −5 dB. FIGS. 15a, 15b and 15c illustrate a comparison of training methods. Using noise in training data reduces the standard deviation of missed detections and also reduces false alarms during silence periods. These benefits seem to increase as the SNR of the training data increases. Also, the effects are most prominent at high test SNRs.

In an illustrative example the own voice recognition is controlled by a single criterion, the threshold, and has an optimum that is noise dependent. It should be clear that one can apply also two or more recognition criteria that have optima that are noise dependent. This will make a predictive criteria space more complex. However, such a multi-criteria detection approach is fully contemplated and is enabled by the herein provided methods.

Impact of Silence Periods

Figure 16:
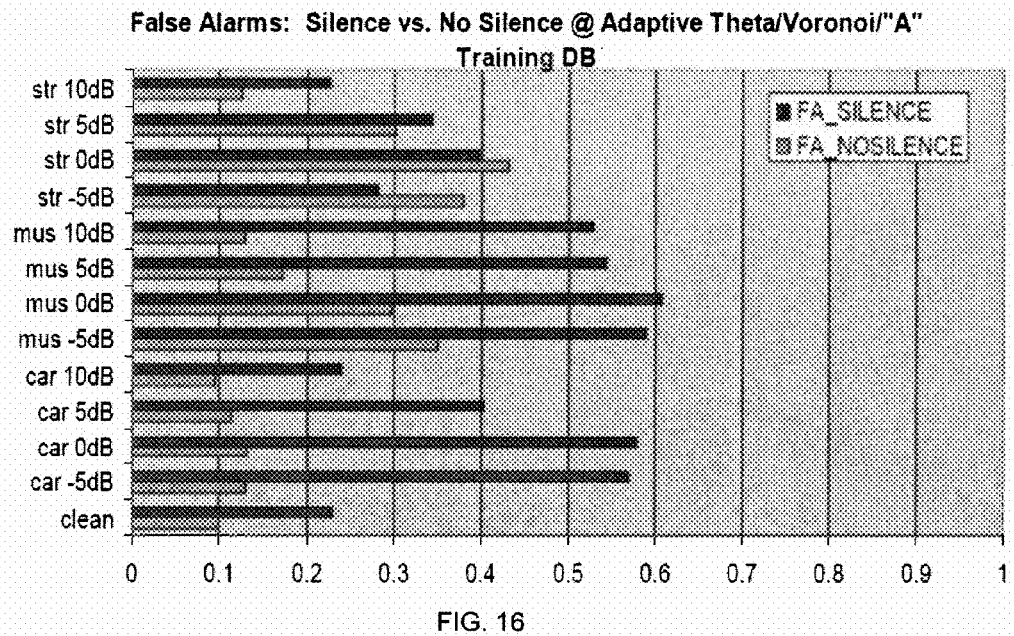
FIG. 16 illustrates yet another performance of a system in accordance with an aspect of the present invention.

FIG. 16 illustrates the false alarms during silence and non silence periods for the test results shown in FIG. 14. It is clear that false alarms are significantly higher during silence periods, and consequently, a silence detector is necessary and provided in a further embodiment of the present invention.

Receiver Operating Curve Analysis

Figure 17:
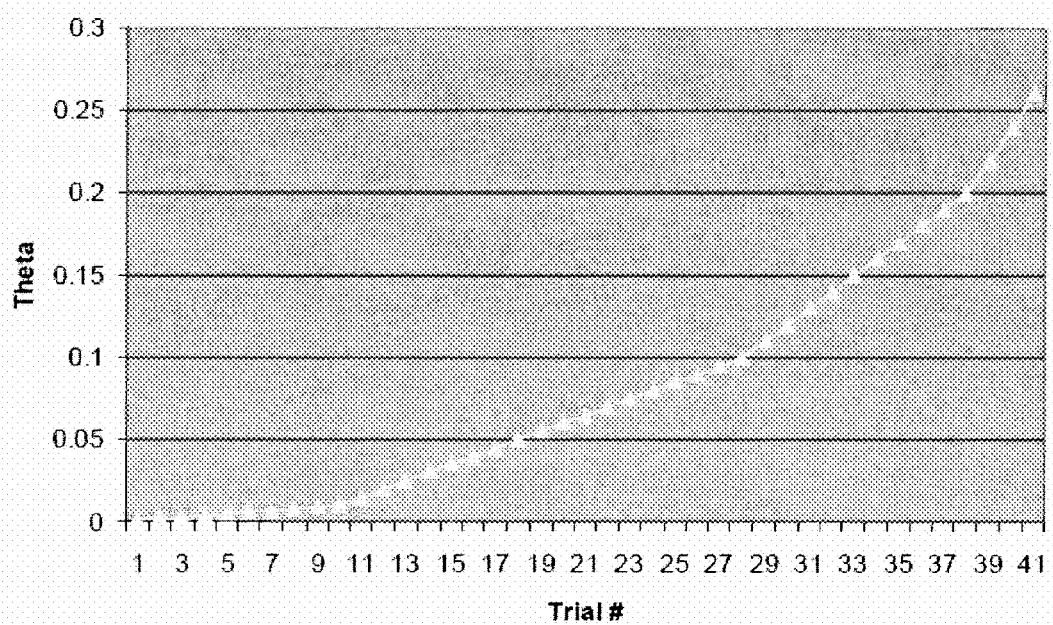
FIG. 17 illustrates detection thresholds of a system in accordance with an aspect of the present invention.

Receiver operating curves (ROC) were generated for 41 different values of theta. These 41 values of theta were chosen on a non-linear scale to reflect the fact that low values of theta are more likely to yield the EER than high values of theta. The chosen values of theta are shown in FIG. 17.

Figure 18:
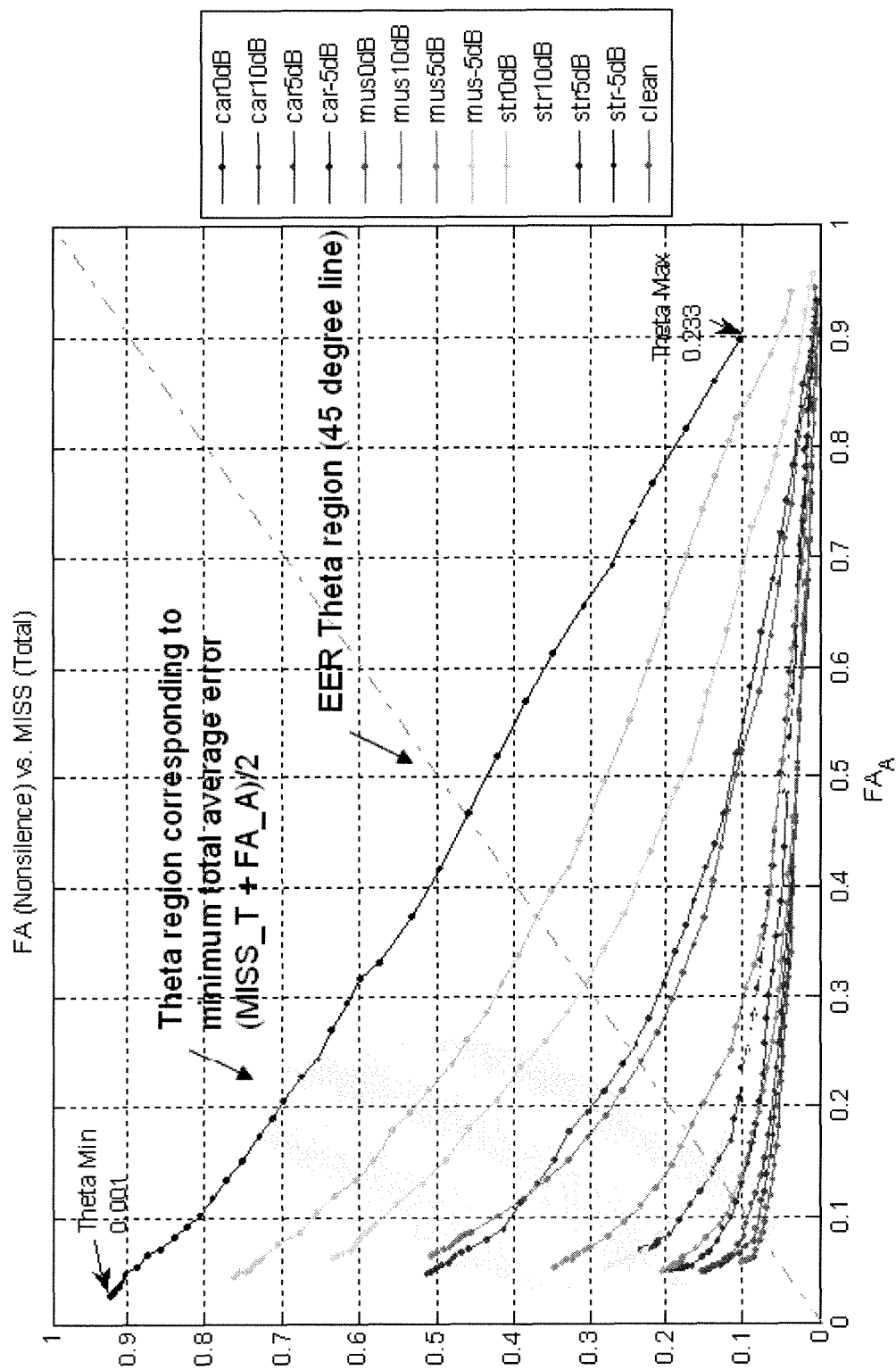
FIGS. 18-19 illustrate receiving operating curves in accordance with an aspect of the present invention.
Figure 19:
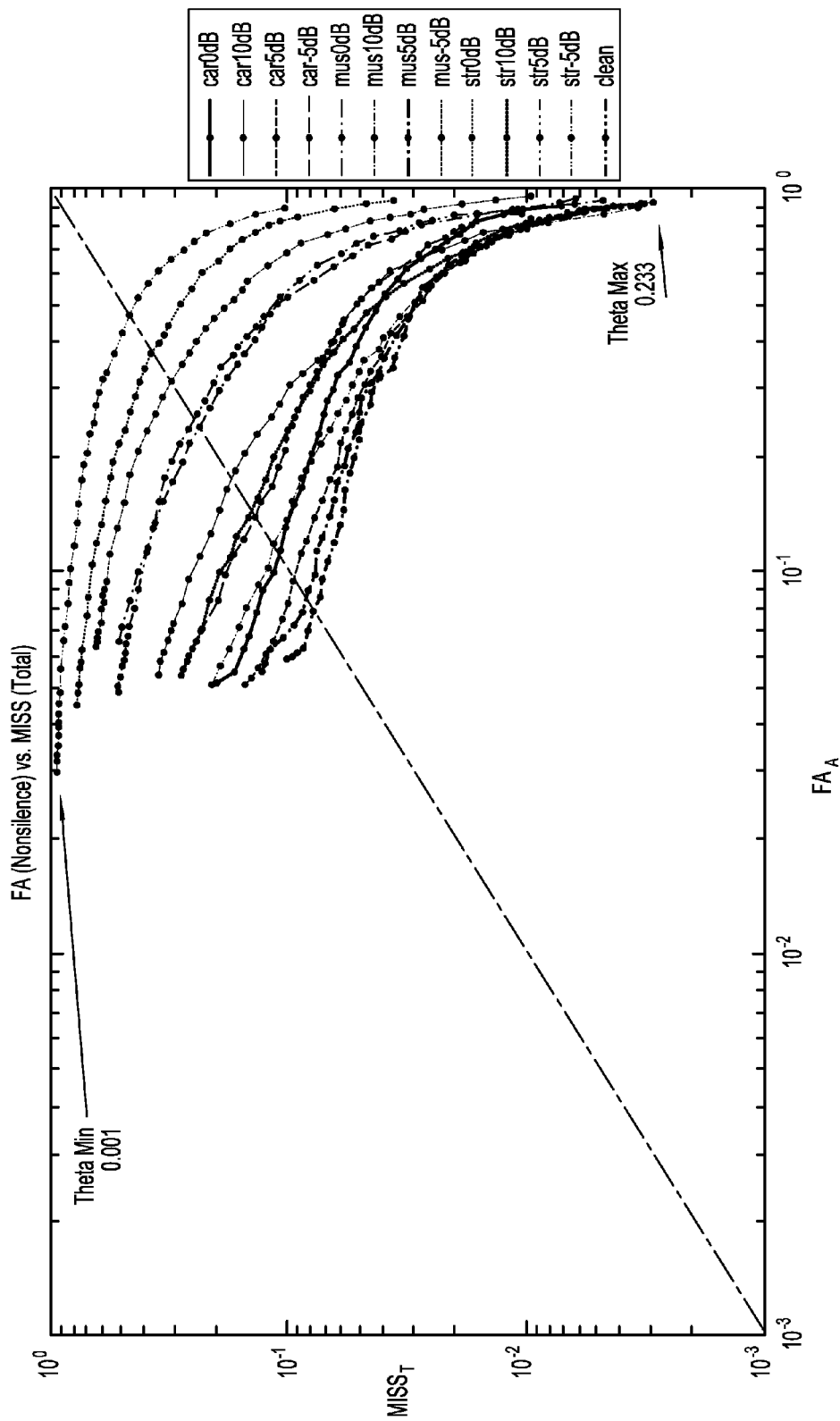

FIG. 18 illustrates the ROC on a linear scale. The theta values which lie on the 45-degree line correspond to the EER thetas for the various scenarios. On the other hand, the thetas in the shaded region correspond to thetas which minimize the total average error (MISS_T+FA_A)/2. It is interesting to note that these entire points lie above the 45 degree EER line, which indicates that the total average errors are minimized by biasing in favor of making more misses than false alarms. This shaded region is for illustrative purposes only; it does not represent the exact region of thetas which minimize the total average errors for each noise scenario, but it provides an approximation. "A.nvq" was used as the training database. For each noise scenario in FIG. 18, the point which minimizes the area of a rectangle created by projecting that point onto the x and y axes represents the theta value which minimizes the total average error. Each of these points lie in the shaded region. The exact values of theta which minimize the total average error are shown in Table 2. FIG. 19 illustrates the same ROC as FIG. 18, but on a log scale.

TABLE 2

Values of theta which minimize the total average error (MISS_T + FA_A)/2 for various noise scenarios. These points lie in the shaded region in FIG. 18.

| Noise Scenario | MinAvgErr_THETA |
| --- | --- |
| clean | 0.0266 |
| car −5 dB | 0.0284 |
| car 0 dB | 0.026 |
| car 5 dB | 0.031 |
| car 10 dB | 0.03 |
| mus −5 dB | 0.047 |
| mus 0 dB | 0.049 |
| mus 5 dB | 0.042 |
| mus 10 dB | 0.0296 |
| str −5 dB | 0.071 |
| str 0 dB | 0.07 |
| str 5 dB | 0.051 |
| str 10 dB | 0.037 |

An own-voice recognition (OVR) system for hearing aids has been provided in accordance with an aspect of the present invention. The system aspects described herein work real time on a processor and take input from the auxiliary input (dummy hearing aid microphone) or way files as well as the actual hearing aid microphone. The processor is enabled to execute instructions that perform the methods provided herein as an aspect of the present invention. It includes online, real-time noise reduction. It also includes real-time adaptation to the noise environment. The present system has a user friendly demonstration version that can be employed in real time to experiment, test and validate the OVR technology.

The OVR system without embedded noise-reduction and noise adaptation (that is OVR Version 1) achieved on average an equal error rate of 5% on clean/office speech from the current database of 25 people. For several other environments, such as inside a car at high speeds or with music background, the equal error rate was on average around or below 20%. However, as shown by tests, the earlier OVR system performed less well on street noise mixtures with a SNR of 0 dB and below. Another problem of the early version OVR system was the high variance of its performance. The experimental results indicate that fixed parameter settings, such as the threshold theta for control of the error tradeoff, are not suitable for optimal performance in noise conditions. To improve on the results of the early OVR system it has been shown that it is important to adaptively deal with high noise and interference scenarios.

The newer present OVR Version is close to the SAT requirements of 5% equal error rate in non-noisy environments and 15% in noisy environments when the input SNR is no worse than approximately 10 dB. Moreover it is possible to be adaptive to the noise level and noise type and balance misdetection and false alarms, as shown in FIG. 14. The OVR Version system as provided herein in accordance with an aspect of the present invention has enhanced recognition rates in the "street" and "music" type of noisy environments, while preserving "car" and "clean" scenarios at the same level of performance as in an earlier OVR Version. Also, misdetection rates were considerably enhanced (being the complement to 100% of the correct recognition rates). Statistics are now consistent with intuition when varying the noise level. False alarms increased as well, and a silence detector is provided in accordance with an aspect of the present invention to eliminate spurious effects during silence in noisy environments. Work presented at for instance ICASSP2009 (34th IEEE International Conference on Acoustics, Speech and Signal Processing) provides noise estimators based on conditional maximum a posteriori probability (MAP) of either noise alone or noise plus speech two hypotheses that can be applied herein. Also, Siemens Research Center in Princeton, N.J. SCR has other modules of varying complexity for silence estimation that can be applied. A by-product of such an approach is the hypothesis silence/voice activity.

The adaptive procedure results were summarized in the A.nvq/Voronoi theta model plots. The relationship for adaptation of the tradeoff parameters theta is learned after fixing training. A value of theta resulting in equal error rates was used. Other detection parameter optima are also contemplated and can be implemented as being adaptive to detected or evaluated background noise properties. The theta that achieves minimum average between misdetection and false alarm error was also considered. Training is computationally intensive, and affects performance. Clean data was used with no denoising (S.nvq); noisy data X.nvq/smooth theta model and A.nvq/Voronoi theta model. It was noticed that training with noisy data improves performance (e.g. false alarm rates and variance of correct and misdetection results over speakers in various scenarios). The present version of the OVR system can be used with fixed or adaptive theta. In the adaptive theta version, the basic values of theta for SNR/Noise Color combinations are defined by an external parameter file, as described herein.

Real-time testing was done in office and car environments and the system shows good recognition in quiet environments. The OVR system as provided herein in accordance with one or more aspects of the present invention can deal with interferences (e.g. car noise, music), when interferences are not too loud (e.g. 10 dB up to at most 5 dB SNR level).

Figure 20:
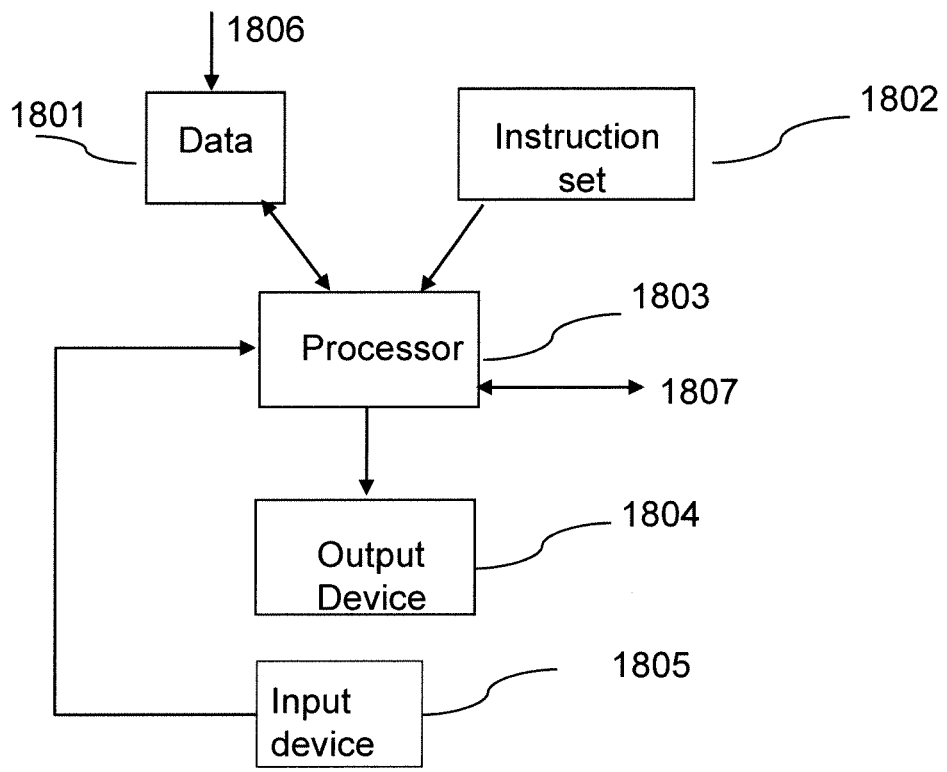
FIG. 20 illustrates a system with a processor in accordance with an aspect of the present invention.

The methods as provided herein are in one embodiment of the present invention implemented on a system or a computer device. A system illustrated in FIG. 20 and as provided herein is enabled for receiving, processing and generating data. The system is provided with data that can be stored on a memory 1801. Data may be obtained from a sensor such as a microphone or may be provided from a data source. Data may be provided on an input 1806. The processor is also provided or programmed with an instruction set or program executing the methods of the present invention is stored on a memory 1802 and is provided to the processor 1803, which executes the instructions of 1802 to process the data from 1801. Data, such as a classification or any other signal resulting from the processor can be outputted on an output device 1804, which may be a display to display data or a loudspeaker to provide an acoustic signal. However, the data generated by the processor may also be used to enable further processing of signals. The processor can also have a communication channel 1807 to receive external data from a communication device and to transmit data to an external device. The system in one embodiment of the present invention has an input device 1805, which may be a sensor, a microphone, a keyboard, a mouse or any other device that can generate data to be provided to processor 1803. The processor can be dedicated hardware. However, the processor can also be a CPU or any other computing device that can execute the instructions of 1802. Accordingly, the system as illustrated in FIG. 20 provides a system for data processing resulting from a sensor or any other data source and is enabled to execute the steps of the methods as provided herein as an aspect of the present invention.

Figure 21:
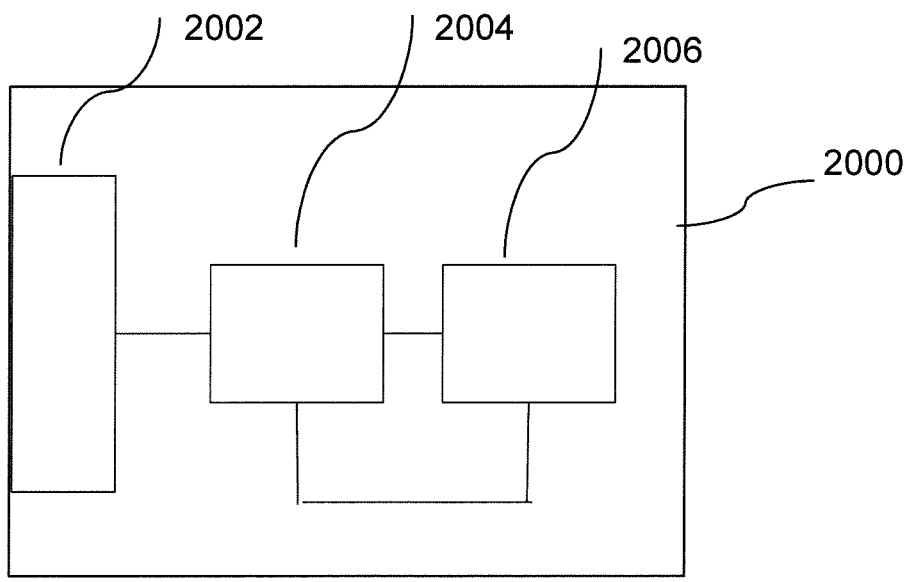
FIG. 21 illustrates a hearing aid in accordance with an aspect of the present invention.

Thus, a system and methods have been described herein for Own Voice Recognition, for instance in a hearing aid. Such a system is illustrated in FIG. 21. A hearing aid 2000 includes a receiver 2002, control circuitry 2004 and a processor 2006. The receiver 2002 receives audio signals in accordance with control circuitry 2004. The audio signals are sent to the processor 2006. The processor 2006 can be in the form shown in the preceding figure. The processor 2006 processes the received signals in accordance with the steps described herein. Depending on the results of the processing, the processor 2006 controls the control circuitry 2004.

The methods that are provided herein as one or more aspects of the present invention are implemented as an illustrative embodiment on a hearing aid. All steps of the methods in one embodiment are implemented on one device. In a further embodiment of the present invention steps can be implemented on more than one device. For instance, a learning step for own voice recognition in such a further embodiment is implemented on a separate learning system. Once the system has adequately learned own voice recognition under different circumstances, one then transfers the learned system to an operational device such as a hearing aid. In yet a further embodiment, one may download data from an operational device such as a hearing aid to a training system, further train for additional environments and upload the additionally trained methods to a hearing aid. This allows off-line training and learning of the predictive threshold space as illustrated in FIGS. 9-11 and allows for instance use of a much larger training data base than is economically available on a single hearing aid.

In yet another embodiment of the present invention the own voice recognition (OVR) methods as provided herein are used in different equipment and environments besides a hearing aid. For instance in one embodiment of the present invention the OVR methods of the present invention are applied in a computer gaming system. In yet another embodiment of the present invention, the OVR methods of the present invention are applied in a video and/or a home theater control system, for instance to change channels by voice. In yet another embodiment of the present invention, the OVR methods of the present invention are applied in a personal computer control system, for instance to start an application or to enter search terms in a browser by voice. In yet another embodiment of the present invention, the OVR methods of the present invention are applied in a control system for equipment, for instance to control a status of the equipment, to control operation of equipment, to shut down the equipment, or to instruct equipment in response to an alert generated by the equipment. In yet another embodiment of the present invention, the OVR methods of the present invention are applied in a control system for a robot, for instance to control a movement or an action of a robot. In yet another embodiment of the present invention, the OVR methods of the present invention are applied in a system that contains a processor, for instance in a consumer product, such as a mobile computing device which may include a phone such as a wireless phone.

The following references provide background information generally related to the present invention and are hereby incorporated by reference: [1.] Y. Zheng, et al., "*Air- and bone-conductive integrated microphones for robust speech detection and enhancement*", AS RU 2003. [2.] Vincent Wan, Steve Renals, "*Evaluation of kernel methods for speaker verification and identification*", ICASSP-02, 2002. [3.] Douglas A. Reynolds, "*Speaker identification and verification using Gaussian mixture speaker models*", Speech Communication archive. Volume 17, Issue 1-2, 1995. [4.] Heiko Claussen, Justinian Rosca, and R. Damper. "*Mutual features for robust identification and verification*", Proc. International Conference on Acoustics, Speech and Signal Processing (ICASSP-08), pp. 1849-1852, Las Vegas, Nev., 2008. [5.] Ningping Fan and Justinian Rosca; "*Enhanced VQ-based algorithms for speech independent speaker identification*", Proc. International Conference on Audio, Video, and Biometric based Person Authentication (AVBPA-03), pp. 470-477, Guildford, UK, June 2003. [6.] Ningping Fan, Justinian Rosca, and Radu Balan; "*Speaker verification with combined threshold, identification front-end, and UBM*", AutoID 2005, Fourth IEEE Workshop on Automatic Identification Advanced Technologies, Buffalo, N.Y., USA, 17-18 Oct. 2005. [7.] Ningping Fan; "*Low distortion speech denoising using an adaptive parametric Wiener filter*", Proc. IEEE International Conference Acoustics Speech, and Signal Processing (ICASSP-04), Montreal, Canada, May 2004. [8.] Ningping Fan, Justinian Rosca, and Radu Balan; "*Speech noise estimation by enhanced minima controlled recursive averaging*", International Conference on Acoustics, Speech, and Signal Processing (ICASSP-07), Honolulu, Hi., USA, 15-20 Apr. 2007. [9] Georgy Voronoi (1907). Nouvelles applications des parametres continus a la theorie des formes quadratiques. Journal fur die Reine und angewandte Mathematik, 133:97178, 1907. [10] Gustav Lejeune Dirichlet (1850). Ueber die Reduktion der positiven quadratischen Formen mit drei unbestimmten ganzen Zahlen. Journal fuer die Reine und angewandte Mathematik, 40:209-227.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for using a single integrated hearing aid by a hearing aid user wearing the single integrated hearing aid, comprising:
   a processor in the single integrated hearing aid to generate a first signal representing sound received by the single integrated hearing aid;
   the processor processing the first signal to provide a noise reduced signal representative of speech by the single integrated hearing aid user and a noise signal;
   the processor processing the noise signal to determine at least a first and a second noise feature;
   the processor processing the noise reduced signal to determine a speech feature;
   the processor estimating an equal error rate classification threshold size based on the at least first and second noise feature;
   the processor processing information from a database of the single integrated hearing aid user's speech, the speech feature and the classification threshold to recognize the noise reduced signal as the single integrated hearing aid user's own voice; and
   the processor changing a processing setting when the processor recognizes the noise reduced signal as the hearing aid user's own voice to modify a beamforming setting in the single integrated hearing aid to reduce a distortion of the hearing aid user's voice in the single integrated hearing aid.

2. The method of claim 1, wherein a noise feature is determined from a noise signal that is derived from a difference between a delayed first signal and the noise reduced signal.

3. The method of claim 1, wherein the at least first noise feature is a signal-to-noise ratio.

4. The method of claim 1, wherein the at least second noise feature is a noise color.

5. The method of claim 4, wherein the noise color is estimated from an entropy measure of normalized spectral noise power evaluated from the noise signal, the normalized spectral noise power being segmented over a plurality of windows.

6. The method of claim 1, wherein the classification threshold is determined from a predictive threshold space that was learned from a plurality of noise signals and a plurality of speech signals from a plurality of speakers.

7. The method of claim 6, wherein the predictive threshold space was learned off-line.

8. The method of claim 6, wherein the predictive threshold space is created from tessellation using discrete training points and points created from interpolation between different classes.

9. A device used by a user, comprising:
a single integrated hearing aid, including:
a memory enabled to store data including instructions to be performed by a processor;
the processor enabled to execute instructions retrieved from the memory on data retrieved from the memory to perform the steps:
receiving a first signal that is a signal representing speech of the user wearing the single integrated hearing aid with an added noise signal;
processing the first signal to provide a noise reduced signal;
determining at least a first and a second noise feature;
determining a speech feature;
estimating an equal error rate classification threshold size based on the at least first and second noise feature;
recognizing the speech feature based on the classification threshold size from a database as the user's voice; and
changing a processing setting when the noise reduced signal is recognized as the user's own voice to modify a beamforming setting in the single integrated hearing aid to reduce a distortion of the hearing aid user's voice in the single integrated hearing aid.

10. The device of claim 9, wherein a noise feature is determined by the processor from a noise signal that is a difference between a delayed first signal and the noise reduced signal.

11. The device of claim 9, wherein the at least first noise feature is a signal-to-noise ratio.

12. The device of claim 9, wherein the at least second noise feature is a noise color.

13. The device of claim 12, wherein the noise color is estimated by the processor from an entropy measure of a normalized spectral noise power evaluated from the noise signal, the normalized spectral noise power being segmented over a plurality of windows.

14. The device of claim 9, wherein the classification threshold is determined by the processor from a predictive threshold space that was learned from a plurality of noise signals and a plurality of speech signals from a plurality of speakers.

15. The device of claim 14, wherein the predictive threshold space is created by tessellation using discrete training points and points created from interpolation between different classes.

16. A method for voice recognition of a device user, comprising:
a processor in the device generating a first signal representing sound received by the device worn by the device user;
the processor processing the first signal to provide a noise reduced signal representative of speech and a noise signal;
the processor processing the noise signal to determine at least a first noise feature;
the processor processing the noise reduced signal to determine a speech feature;
the processor estimating a classification criterion based on the at least first noise feature;
the processor processing information from a database of the device user's speech, the speech feature and the classification criterion to recognize the noise reduced signal as the device user's own voice; and
the processor modifying a beamforming setting to reduce a distortion of the device user's own voice in the device based on the previous steps.

* * * * *